United States Patent
Mori et al.

(10) Patent No.: US 6,914,112 B2
(45) Date of Patent: Jul. 5, 2005

(54) ETHYLENE COPOLYMER AND ETHYLENE/ α-OLEFIN COPOLYMER COMPOSITION AND PROPYLENE POLYMER COMPOSITION BOTH CONTAINING THE ETHYLENE COPOLYMER

(75) Inventors: Ryoji Mori, Sodegaura (JP); Kouichi Kizu, Sodegaura (JP); Keiji Okada, Sodegaura (JP); Kazuyuki Takimoto, Yamaguchi (JP)

(73) Assignee: Mitsui Chemical, Inc., Tokyo (JP)

( * ) Notice: Subject to any disclaimer, the term of this patent is extended or adjusted under 35 U.S.C. 154(b) by 173 days.

(21) Appl. No.: 10/030,383

(22) PCT Filed: May 15, 2001

(86) PCT No.: PCT/JP01/04038

§ 371 (c)(1),
(2), (4) Date: Jan. 10, 2002

(87) PCT Pub. No.: WO01/88000

PCT Pub. Date: Nov. 22, 2000

(65) Prior Publication Data

US 2003/0114579 A1 Jun. 19, 2003

(30) Foreign Application Priority Data

May 16, 2000 (JP) ....... 2000-148646
Jul. 12, 2000 (JP) ....... 2000-211620
Jul. 27, 2000 (JP) ....... 2000-226632

(51) Int. Cl.$^7$ ............................................. C08F 232/00
(52) U.S. Cl. ...................... 526/281; 526/283; 526/308; 526/348; 526/916
(58) Field of Search ................. 526/281, 283, 526/308; 525/240

(56) References Cited

U.S. PATENT DOCUMENTS

| | | | |
|---|---|---|---|
| 5,243,001 A | 9/1993 | Winter et al. | |
| 5,391,618 A | 2/1995 | Yamamoto et al. | |
| 5,459,217 A | 10/1995 | Todo et al. | |

FOREIGN PATENT DOCUMENTS

| | | |
|---|---|---|
| EP | 0791626 A1 | 8/1996 |
| EP | 0791627 A1 | 8/1996 |
| EP | 0754698 A | 1/1997 |
| EP | 0781789 A2 | 7/1997 |
| EP | 0 781 789 A2 | 7/1997 |
| EP | 1178102 A1 | 2/2002 |
| EP | 1 178 102 A1 | 2/2002 |
| JP | 4268307 A | 9/1992 |
| JP | 6192500 A | 7/1994 |
| JP | 9235313 A | 9/1997 |
| JP | 10-273563 A | 10/1998 |
| JP | 10273563 A | 10/1998 |
| JP | 11-209532 A | 8/1999 |
| JP | 11-228753 A | 8/1999 |
| WO | 97/10295 A1 | 3/1997 |
| WO | 97/10296 A1 | 3/1997 |

OTHER PUBLICATIONS

Lindeman et al., *Analytical Chemistry*, vol. 43, No. 10, pp. 1247–1252 (Aug. 1971).
*Macromolecules*, vol. 8, No. 5, pp. 687–689 (Oct. 1975).
*Macromolecules*, vol. 6, No. 6, pp. 925–926 (Nov.–Dec. 1973).
*Macromolecules*, vol. 15, pp. 353–360 (1982).
*Macromolecules*, vol. 10, No. 4, pp. 773–778 (Jul.–Aug. 1977).
Tsutsui et al., *Polymer*, vol. 30, pp. 1350–1356 (Jul. 1989).
*Review Macromolecular Chemistry Physics*, C29, pp. 201–317 (1989).

*Primary Examiner*—Roberto Rabago
(74) *Attorney, Agent, or Firm*—Birch, Stewart, Kolasch & Birch, LLP

(57) ABSTRACT

An ethylene-based copolymer is useful as a modifier for resins, e.g., polypropylene, and can be used in an ethylene/α-olefin copolymer composition containing the same ethylene-based copolymer. The inventive copolymer is characterize by: (a-1) having temperature (Tm) at the maximum peak in the endothermic curve, measured by a differential scanning calorimeter (DSC), of 40 to 90° C., (a-2) containing the component soluble in decane at normal temperature at 1 to 70% b weight, and (a-3) containing the component soluble in decane at normal temperature which comprises (i) a recurring unit derived from ethylene and (ii) a recurring unit derived from an α-olefin of 4 or more carbon atoms, and in which a content of (i) the recurring unit derived from ethylene is 50 to 75% by mole.

2 Claims, No Drawings

ETHYLENE COPOLYMER AND ETHYLENE/α-OLEFIN COPOLYMER COMPOSITION AND PROPYLENE POLYMER COMPOSITION BOTH CONTAINING THE ETHYLENE COPOLYMER

This application is the national phase under 35 U.S.C. § 371 of PCT International Application No. PCT/JP01/04038 which has an International filing date of May 15, 2001, which designated the United States of America.

FIELD OF THE INVENTION

The present invention relates to an ethylene-based copolymer useful as a modifier for resins, e.g., polypropylene, and an ethylene/α-olefin copolymer composition containing the same ethylene-based copolymer. The present invention also relates to a propylene-based copolymer composition containing the same ethylene/α-olefin copolymer composition, and its use.

BACKGROUND OF THE INVENTION

It is well known that a polypropylene resin is blended with an elastomer, e.g., ethylene/propylene or ethylene/butene copolymer, to improve its impact resistance.

However, blend of the elastomer led deterioration in rigidity of the polypropylene resin, therefore there is a limit in the amount of the blended elastomer. A formed resin article, e.g., that of polypropylene resin, may be required to have impact resistance both at normal temperature and low temperature. Impact resistance at low temperature may not always correspond to that at normal temperature. Blend of a soft rubber as the modifier may be one method for improving impact resistance at low temperature. However, blend of the soft rubber with a polypropylene resin leads rigidity of the formed article to deteriorate and causes the same problem as above.

Therefore, the modifier capable of keeping the resin in which it is blended well balanced with respect to rigidity and impact resistance has been in demand. On the other hand, a formed resin article, e.g., that described above, is also required to be difficult to fracture under service conditions, by which is meant that it is required to have a high tensile breaking point strength and impact strength while keeping a high rigidity. In other words, the resin modifier capable of keeping the resin in which it is blended well balanced with respect to rigidity and tensile breaking elongation has been also in demand.

Japanese Patent Laid-Open Publication No. 192500/1994 discloses a composition having well-balanced rigidity and impact resistance by incorporating a polypropylene polymer with an ethylene/α-olefin copolymer of specific properties. However, this composition is insufficient in the balances between rigidity and impact strength at low temperature and between rigidity and tensile elongation properties, and is required to be further improved.

Moreover, when modifying resin, some resin modifiers for the above-described resins cause problems, e.g., blocking during the kneading process at a supply section of the kneader, e.g., hopper, to deteriorate productivity and unstable properties of the modified resin.

Therefore, development of the resin modifier capable of improving properties of polypropylene or other resins, in particular tensile breaking point elongation and impact resistance at low temperature, while keeping its rigidity, and, at the same time, causing little problems, e.g., blocking, and excellent in productivity and workability has been keenly demanded.

The inventors of the present invention have already proposed specific compositions of [A] a copolymer of ethylene and α-olefin o 4 to 20 carbon atoms, [B] a copolymer of ethylene and α-olefin if 3 to 20 carbon atoms and [C-1] a high-density polyethylene, as the modifiers which can satisfy the above requirements (Japanese Patent Laid-Open Publication No. 273563/1998. However, these compositions cannot always give the modified resin of well-balanced impact resistance and bending modulus of elasticity.

DISCLOSURE OF THE INVENTION

The ethylene-based copolymer [I] of the present invention is characterized by:

(a-1) having temperature ($T_m$) at the maximum peak in the endothermic curve, measured by a differential scanning calorimeter (DSC), of 40 to 90° C., (a-2) containing the component soluble in decane at normal temperature at 1 to 70% by weight, and (a-3) containing the component soluble in decane at normal temperature which comprises (i) a recurring unit derived from ethylene and (ii) a recurring unit derived from an α-olefin of 4 or more carbon atoms, and in which a content of (i) the recurring unit derived from ethylene is 50 to 75% by mole.

The ethylene-based copolymer composition [II] of the present invention is characterized by containing the ethylene-based copolymer which satisfies the following conditions (b-1) to (b-3):

(b-1) having temperature ($T_m$) at the maximum peak in the endothermic curve of the component soluble in decane at 64° C., measured by a differential scanning calorimeter (DSC), of 40 to 90° C., (b-2) containing the component soluble in decane at 64° C. which contains the component soluble in decane at normal temperature at 1 to 70% by weight, and (b-3) containing the component soluble in decane at normal temperature which comprises (i) a recurring unit derived from ethylene and (ii) a recurring unit derived from an α-olefin of 4 or more carbon atoms, and in which a content of (i) the recurring unit derived from ethylene is 50 to 75% by mole.

The propylene-based copolymer composition [III] of the present invention is characterized by containing the propylene-based copolymer and satisfying the following conditions (c-1) to (c-3):

(c-1) containing the component soluble in decane at 64° C. at 1 to 99% by weight which has a temperature ($T_m$) at the maximum peak in the endothermic curve, measured by a differential scanning calorimeter (DSC), of 40 to 90° C., (c-2) containing the component soluble in decane at 64° C. which contains the component soluble in decane at normal temperature at 1 to 70% by weight, and (c-3) containing the component soluble in decane at normal temperature which comprises (i) a recurring unit derived from ethylene and (ii) a recurring unit derived from an α-olefin of 4 or more carbon atoms, and in which a content of (i) the recurring unit derived from ethylene is 50 to 75% by mole.

The ethylene/α-olefin copolymer composition of the present invention comprises:
1 to 70% by weight of [A] a copolymer of ethylene and α-olefin of 4 to 20 carbon atoms which comprises (A-i) 50 to 70% by mole of (a) a recurring unit derived from ethylene and 30 to 50% by mole of (b) a recurring unit derived from an α-olefin of 4 to 20 carbon atoms, and 30 to 99% by weight of [B] an at least one of ethylene-based copolymer comprising (a) ethylene, (b) at least one monomer selected form α-olefin of 4 to 20 carbon atoms and cyclic olefin-based compound, and having (B-i) a density of 0.870 to 0.895 g/cm³.

It is preferable that the ethylene/α-olefin copolymer composition have a melt flow rate (MFR at 190° C. and a load of 2.16 kg) of 0.01 to 50 g/10 minutes and that ratio of density ($d_b$) of the ethylene-based copolymer [B] to density ($d_a$) of the ethylene/α-olefin copolymer [A] ($d_b/d_a$) of 1.05 or less. It is also preferable that the above-described ethylene/α-olefin copolymer [A] has (A-ii) a glass transition temperature of −60° C. or lower, determined by a differential scanning calorimeter (DSC), crystallinity of 1% or less, and (A-iii) B value of 0.9 to 1.5, given by the following general formula (1):

$$B \text{ value} = [P_{OE}]/(2[P_E][P_O]) \qquad (1)$$

wherein, $[P_E]$ is molar fraction of the ethylene-derived recurring unit in the copolymer, $[P_O]$ is molar fraction of the α-olefin-derived recurring unit in the copolymer, and $[P_{OE}]$ is a number ratio of the ethylene/α-olefin copolymer chains to the total dyad chains in the copolymer, determined by the $^{13}$C-NMR spectroscopy.

It is also preferable that the above-described ethylene/α-olefin copolymer [A] have (A-iv) an intrinsic viscosity [η] of 0.1 to 10.0 dl/g, determined in decalin at 135° C.

It is also preferable that the ethylene-based copolymer [B] for the ethylene/α-olefin copolymer composition of the present invention have a melt flow rate (at 190° C. and a load of 2.16 kg) of 0.1 to 50 g/10 minutes and (B-iii) temperature ($T_m$) at the maximum peak in the endothermic curve, measured by a differential scanning calorimeter (DSC), be correlated with density (d) by the following relationship:

$$Tm < 400 \times d - 250$$

The above ethylene/α-olefin copolymer composition is suitable for producing a resin modifier.

The method of the present invention for modifying resin is characterized by blending the pellets of the above ethylene/α-olefin copolymer composition in the molten resin it tries to modify.

The propylene-based polymer composition (1) of the present invention is comprised of the propylene-based polymer [C-1], ethylene/α-olefin copolymer [A] and ethylene-based copolymer [B], and characterized by:

(i) containing the propylene-based polymer [C-1] at 99 to 1% by weight, and ethylene/α-olefin copolymer [A] and ethylene-based copolymer [B] at 1 to 99% by weight (total content of [A] and [B]), and (ii) having a content ratio of the ethylene/α-olefin copolymer [A] to the ethylene-based copolymer [B], i.e., [A]/[B] content ratio, is 1/99 to 70/30.

It is preferable that the propylene-based polymer [C-1] be contained at 98 to 60% by weight, and the ethylene/α-olefin copolymer [A] and ethylene-based copolymer [B] at 2 to 40% by weight (total content of [A] and [B]).

It is also preferable that the propylene-based polymer [C-1] have a melt flow rate (at 230° C. and a load of 2.16 kg) of 0.01 g/10 minutes or more.

It is preferable that the ethylene/α-olefin copolymer of the present invention have a damping factor peak caused from the glass transition temperature of the propylene-based polymer [C-1] and that caused from the glass transition temperature of the ethylene/α-olefin copolymer composition (composed of the ethylene/α-olefin copolymer [A] and ethylene-based copolymer [B]), when the temperature-dependence of the modulus of elasticity is measured, and that these peaks are separated from each other.

The propylene-based copolymer composition (2) of the present invention is comprised of 20 to 93% by weight of [C-2], 6 to 79% by weight of [AB] and 1 to 25% by weight of [D]:

[C-2]: a Propylene-based Polymer:
(1) having a melt flow rate (230° C. and a load of 216 kg) of 0.1 to 400 g/10 minutes, determined in accordance with ASTM D-1238,
(2) containing 0.01 to 30% by weight of the component soluble in decane at normal temperature, and an intrinsic viscosity [η] of 0.2 to 10 dl/g, determined in decalin at 135° C., and
(3) having a pentad isotacticity ($I_5$) of 0.95 or more, determined by the $^{13}$C-NMR spectroscopy for the component insoluble in decane at normal temperature;

[AB]: an ethylene/α-olefin Copolymer Composition, Composed of:
[A-1]: an ethylene/α-olefin copolymer of ethylene and α-olefin of 4 to 20 carbon atoms, (i) comprising 50 to 70% by mole of (a) a recurring unit derived from the ethylene and 30 to 50% by mole of (b) a recurring unit derived from the α-olefin of 4 or more carbon atoms, and (ii) having an intrinsic viscosity [η] of 0.1 to 10.0 dl/g, determined in decalin at 135° C., and

[B-1]: an ethylene-based copolymer of (a) ethylene and (b) at least one compound selected from the group consisting of α-olefins and cyclo-olefins of 3 to 20 carbon atoms, having (i) a density of 0.870 to 0.895 g/cm³ and (ii) a melt flow rate (190° C. and a load of 2.16 kg) of 0.1 to 50 g/10 minutes, wherein the copolymers [A-1] and [B-1] are incorporated at 1 to 50% and 50 to 99% by weight, respectively, based on the whole composition, and

[D]: An Inorganic Filler.

It is preferable that ratio of density ($d_2$) of the ethylene-based copolymer [B-1] to density ($d_1$) of the ethylene/α-olefin copolymer [A-1] ($d_2/d_1$) be 1.05 or less.

It is preferable that the propylene-based copolymer composition (2) of the present invention have a damping factor peak derived from the glass transition temperature of the propylene-based polymer [C-2] and that derived from the glass transition temperature of the ethylene/α-olefin composition [AB], when the temperature-dependence of the modulus of elasticity is measured, and that these peaks be separated from each other.

The propylene-based copolymer composition (2) is used for the formed articles, suitable for sheets and injection-molded articles, e.g., automobile interiors and exteriors, and electric appliance cases.

The propylene-based copolymer composition (3) of the present invention is composed of 20 to 95% by weight of [C-3] and 5 to 80% by weight of [AB-1]:

Wherein [C-3] is a propylene/α-olefin copolymer, and
(1) having an intrinsic viscosity [η] of 0.01 to 10 dl/g, determined in decalin at 135° C., and
(2) comprising propylene and 1.5 to 10% by mole of an α-olefin, other than propylene, of 2 to 20 carbon atoms, and
[AB-1] is an ethylene/α-olefin copolymer composition, composed of:

[A-1]: an ethylene/α-olefin copolymer of ethylene and α-olefin of 4 to 20 carbon atoms,
(i) comprising 50 to 70% by mole of (a) a recurring unit derived from the ethylene and 30 to 50% by mole of (b) a recurring unit derived from the α-olefin of 4 to 20 carbon atoms, and (ii) having an intrinsic viscosity [η] of 0.1 to 10.0 dl/g, determined in decalin at 135° C., and

[B-1]: an ethylene-based copolymer of (a) ethylene and (b) at least one compound selected from the group consisting of α-olefins and cyclo-olefins of 3 to 20 carbon atoms, having (i) a density of 0.870 to 0.895 g/cm³ and (ii) a melt flow rate (at 190° C. and a load of 2.16 kg) of 0.1 to 50 g/10 minutes, wherein the copolymers [A-1] and [B-1] are blended at 1 to 50% and 50 to 99% by weight, respectively, based on the whole composition.

It is preferable for the propylene/α-olefin copolymer composition (3) that ratio of density ($d_2$) of the ethylene-based copolymer [B-1] to density ($d_1$) of the ethylene/α-olefin copolymer [A-1] ($d_2/d_1$) be 1.05 or less.

It is preferable that the propylene/α-olefin copolymer composition (3) have a damping factor peak derived from the glass transition temperature of the propylene/α-olefin [C-3] and that derived from the glass transition temperature of the ethylene/α-olefin copolymer [AB-1], when the temperature-dependence of the modulus of elasticity is measured, and that these peaks be separated from each other.

It is preferable that the propylene/α-olefin copolymer [C-3] has a microisotacticity of 0.8 or more, with respect to the triad chains of propylene.

It is also preferable that the propylene/α-olefin copolymer [C-3] has a molecular weight distribution (Mw/Mn) of 6 or less, determined by GPC and glass transition temperature Tg of −10° C. or lower.

The propylene/α-olefin copolymer composition is used for the formed articles, suitable for sheets, films and, in particular, filaments. It is also suitable for medical containers and tubes, and transfusion containers and tubes.

BEST MODE FOR CARRYING OUT THE INVENTION

The novel copolymer and copolymer composition of the present invention and use thereof are described more concretely.

First, the novel ethylene-based copolymer [I] of the present invention is described.

[Ethylene-based Copolymer [I]]

The ethylene-based copolymer [I] of the present invention comprises ethylene and α-olefin other than ethylene, containing the recurring unit derived from ethylene and that derived from α-olefin other than ethylene. It may contain the recurring unit derived from a cyclo-olefin.

The concrete examples of the α-olefins, other than ethylene, useful for the present invention include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 1-octene, 3-ethyl-1-hexene, 1-decene, 1-dodecene, 1-tetradecene, 1-hexadecene, 1-octadecene, and eicosene, of which 1-butene, 1-hexene and 1-octene are more preferable.

The cyclo-olefins useful for the present invention include those represented by the following general formula (1-1) or (1-2).

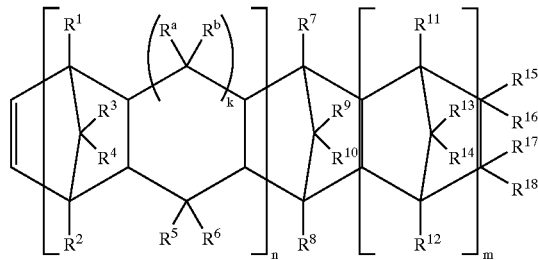

(1-1)

In the above formula, "n" is 0 or 1; "m" is 0 or a positive integer; "k" is 0 or 1, where the ring involving "k" is 6-membered when "k" is 1 and 5-membered when "k" is 0; and $R^1$ to $R^{18}$ and $R^a$ and $R^b$ in the formula (1-1) are each H, a halogen atom (F, Cl, Br or I) or hydrocarbon group. Further, in the formula, $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$, may be bound to each other to form, in a concerted manner, a mono- or poly-cycle group which may contain a double bond.

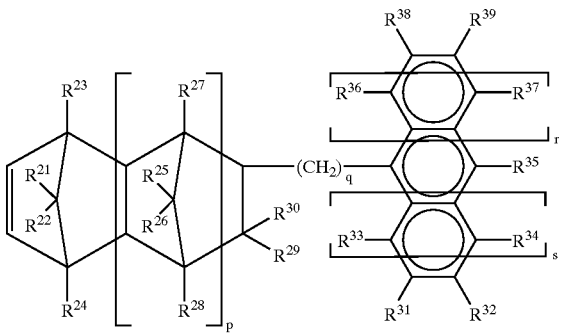

(1-2)

In the above formula (1-2), "p" and "q" are each 0 or a positive integer; "r" and "s" are each 0, 1 or 2; and $R^{21}$ to $R^{39}$ are each H, a halogen atom, or hydrocarbon or alkoxy group.

The halogen atom in the formula (1-2) is the same as that in the formula (1-1).

The examples of the hydrocarbon groups normally include an alkyl group of 1 to 20 carbon atoms, and cycloalkyl group and aromatic hydrocarbon group of 3 to 15 carbon atoms. More concretely, the alkyl groups of 1 to 20 carbon atoms include methyl, ethyl, propyl, isopropyl, amyl, hexyl, octyl, decyl, dodecyl, and octadecyl. These groups may be substituted with a halogen atom.

The cycloalkyl groups include cyclohexyl; and aromatic hydrocarbon groups include aryl and aralkyl, more concretely phenyl, tolyl, naphthyl, benzyl and phenylethyl.

The alkoxy groups include methoxy, ethoxy and propoxy, wherein the carbon atom to which $R^{29}$ and $R^{30}$ are bound may be bound to the carbon atom to which $R^{33}$ or $R^{31}$ is bound, either directly or via an alkylene group of 1 to 3 carbon atoms. When these carbon atoms are bound to each other via an alkylene group, $R^{29}$ and $R^{30}$ or $R^{30}$ and $R^{31}$ jointly form an alkylene group in methylene ($CH_2$), ethylene ($CH_2CH_2$) or propylene ($CH_2CH_2CH_2$) group.

Moreover, $R^{35}$ and $R^{32}$ or $R^{35}$ and $R^{39}$ may be bound to each other to form a mono- or poly-cyclic aromatic ring, when r=s=0. The concrete examples of the cyclo-olefins represented by the general formula (1-1) or (1-2) include a bicyclo-2-heptane derivative (bicyclohept-2-ene-2 derivative), tricyclo-3-decene derivative, tricyclo-3-undecene derivative, tetracyclo-3-dodecene derivative, pentacyclo-4-pentadecene derivative, pentacyclopentadecadiene derivative, pentacyclo-3-pentadecene derivative, pentacyclo-3-hexadecene derivative, pentacyclo-4-hexadecene derivative, hexacyclo-4-heptadecene derivative, heptacyclo-5-eicosene derivative, heptacyclo-4-eicosene derivative, heptacyclo-5-heneicosene derivative, octacyclo-5-docosene derivative, nonacyclo-5-pentacosene derivative, nonacyclo-6-hexacosene derivative, cyclopentadiene-acenaphthylene adduct, 1,4-metano-1,4,4a,9a-tetrahydrofluorene derivative, and 1,4-metano-1,4,4a,5,10,10a-hexahydroanthracene derivative.

The ethylene-based copolymer [I] of the present invention preferably has an MFR (190° C. and a load of 2.16 kg) of 0.01 to 50 g/10 minutes, more preferably 0.01 to 30 g/10 minutes.

(1) Component Soluble in Decane at Normal Temperature

The ethylene-based copolymer [I] of the present invention contains the component soluble in decane at normal temperature at 1 to 70% by weight, preferably 1 to 60%, more preferably 1 to 50%, still more preferably 1 to 30%, still more preferably 1 to 29%, wherein normal temperature means room temperature, normally 23° C.

The component soluble in decane at normal temperature is comprising the recurring units derived from (i) ethylene and (ii) an α-olefin of 4 or more carbon atoms.

The component soluble in decane at normal temperature contains the ethylene-derived recurring unit at 50 to 75% by mole, preferably 55 to 75%, more preferably 60 to 72%, still more preferably 60 to 70%. The balance comprises the unit derived from an α-olefin of 4 or more carbon atoms.

The component soluble in decane at normal temperature may contain the above-described cyclo-olefin, propylene or other compounds at 3% by mole or less as the total content, in addition to the ethylene-derived recurring unit.

The decane-soluble component preferably has a glass transition temperature of −60° C. or lower, determined by a differential scanning calorimeter (DSC), more preferably −65° C. or lower, and preferably crystallinity of 1% or less, preferably 0.5% or less.

The decane-soluble component preferably has an intrinsic viscosity [η] of 0.1 to 10.0 dl/g, determined in decalin at 135° C., more preferably 1 to 8 dl/g, still more preferably 2 to 7 dl/g.

The decane-soluble component preferably has a B value of 0.9 to 1.5, more preferably 1.0 to 1.2, wherein the B value is given by the following general formula (1):

$$B \text{ value} = [P_{OE}]/(2[P_E][P_O]) \quad (1)$$

wherein, $[P_E]$ is molar fraction of the ethylene-derived recurring unit in the copolymer, $[P_O]$ is molar fraction of the α-olefin-derived recurring unit in the copolymer, and $[P_{OE}]$ is a number ratio of the ethylene/α-olefin copolymer chains to the total dyad chains in the copolymer, determined by the $^{13}$C-NMR spectroscopy.

The B value is an index representing the distributions of ethylene and an α-olefin of 4 to 20 carbon atoms, and can be determined by the methods proposed by, e.g., J. C. Randall (Macromolecules, 15, 353 (1982)) and J. Ray (Macromolecules, 10, 773 (1977)).

As the B value increases, the block chains in the ethylene-based copolymer become shorter, making the ethylene and α-olefin distributions more uniform, and copolymer rubber composition distribution narrower. As the B value decreases to below 1.0, the ethylene-based copolymer composition distribution becomes broader, possibly deteriorating its handling characteristics.

It is preferable that ratio of density $(d_B)$ of the component soluble in decane at normal temperature to density $(d_A)$ of the ethylene-based copolymer per se $(d_B/d_A)$ be 1.01 to 1.05, preferably 1.01 to 1.04.

The ethylene-based copolymer having the $(d_B/d_A)$ ratio in the above range has excellent transparency and breaking elongation, and exhibits excellent properties as a modifier.

(2) Component Insoluble in Decane at Normal Temperature

The component insoluble in decane at normal temperature of the ethylene-based copolymer of the present invention contains the recurring unit derived from ethylene and at least one of the recurring units derived from an α-olefin and cyclo-olefin of 3 or more carbon atoms. It is preferably a copolymer of ethylene and an α-olefin of 3 or more carbon atoms The component insoluble in decane at normal temperature preferably has a melt flow rate (at 190° C. and a load of 2.16 kg) of 0.1 to 50 g/10 minutes, more preferably 0.3 to 30 g/10 minutes.

The component insoluble in decane at normal temperature preferably has temperature $(T_m)$ at the maximum peak in the endothermic curve, measured by a differential scanning calorimeter (DSC), is correlated with density (d) by the following relationship:

$$Tm < 400 \times d - 250$$

The ethylene-based copolymer of the present invention is preferably soluble completely in decane at 64° C.

It is preferable that in the ethylene-based copolymer of the present invention, when homopolypropylene having an MFR (at 190° C. and a load of 2.16 kg) of 40 to 60 g/10 minutes is blended with ethylene copolymer so as to 75/25 of the weight ratio (homopolypropylene/ethylene-based copolymer) and then the temperature-dependence of the modulus of elasticity of the obtainable mixture is measured, the mixture have a damping factor (tan δ) peak caused from the glass transition temperature of the homopolypropylene and damping factor (tan δ) peak caused from the glass transition temperature of the ethylene-based copolymer, and these peaks be separated from each other. It is judged that these peaks are "separated," when the two peaks are distinctly observed, or there is a saddle between the tops of these peaks. The ethylene-based copolymer will be excellent both in impact resistance and rigidity, when it has two "separated" peaks.

The ethylene-based copolymer may be insufficient both in impact resistance and rigidity, when these peaks are not distinctly "separated" but are "fused" with each other.

The damping factor peak is confirmed by measurement of viscoelasticity, where the sample is prepared by melting and kneading the mixture of the homopolypropylene and ethylene-based copolymer which satisfy the above properties by a biaxial kneader or extruder at 200° C. as cylinder temperature into the pellets and then injection-molding the pellets. The measurement of viscoelasticity is described in detail in below-mentioned EXAMPLES.

Separation of soluble-insoluble component in decane at normal temperature in the ethylene-based copolymer of the present invention can be conducted in the following manner. The sample (5 g) is immersed in 200 ml of decane at room temperature (23° C.) for 5 hours with stirring, and the residue is separated by filtration at room temperature (23° C.) by a G4 glass filter into the solid phase (the insoluble component) and filtrate (the soluble component), each of which is dried. Separation of soluble-insoluble component in decane at 64° C. in the ethylene-based copolymer can be conducted in the following manner. The sample (5 g) is immersed in 200 ml of boiling decane for 5 hours to be dissolved, and the dissolution is cooled to 64° C. The precipitated solid component is separated by filtration by a G4 glass filter into the solid phase (the insoluble component) and filtrate (the soluble component), each of which is dried.

The ethylene-based copolymer of the present invention has temperature ($T_m$) at the maximum peak in the endothermic curve, measured by a differential scanning calorimeter (DSC), of 40 to 90° C., preferably 45 to 90° C., more preferably 55 to 90° C.

Such an ethylene-based copolymer can be obtained by blending 1 to 70% by weight of the component [A] with 30 to 99% by weight of the component [B] The methods for producing these components [A] and [B] are described later.

[Ethylene-based Copolymer Composition [II]]

The ethylene-based copolymer composition [II] of the present invention is characterized by containing the ethylene-based copolymer [I'] which satisfies the following conditions (b-1) to (b-3).

(b-1) Temperature ($T_m$) at the maximum peak in the endothermic curve of the component soluble in decane at 64° C., measured by a differential scanning calorimeter (DSC), is 40 to 90° C., preferably 50 to 90° C.

(b-2) The copolymer [I'] contains the component soluble in decane at 64° C. contains the component soluble in decane at normal temperature at 1 to 70% by weight, preferably 1 to 60%, more preferably 1 to 50%, still more preferably 1 to 30%, still more preferably 1 to 29%, wherein normal temperature means room temperature, normally 23° C.

(b-3) The copolymer [I'] contains the component soluble in decane at normal temperature comprises (i) a recurring unit derived from ethylene and (ii) a recurring unit derived from an α-olefin of 4 or more carbon atoms, at 50 to 75% by mole for the former, preferably 55 to 75%, more preferably 60 to 72%, still more preferably 60 to 70%. The balance comprises the unit derived from an α-olefin of 4 or more carbon atoms. The component soluble in decane at normal temperature may contain the above-described cyclo-olefin, propylene or other components at 3% by mole or less as the total content.

The examples of the components soluble and insoluble in decane at normal temperature are those for the above-described ethylene-based copolymer [I].

The component soluble in decane at 60° C. is the sum of the components soluble in decane at normal temperature of the above-described ethylene-based copolymer [I] and the component soluble in decane at temperatures up to 64° C.

One of the examples of the component soluble in decane at 64° C. but insoluble at normal temperature is the one insoluble at normal temperature for the above-described ethylene-based copolymer [I].

The ethylene-based copolymer composition [II] of the present invention preferably contains the ethylene-based copolymer [I'] at 1 to 99% by weight, more preferably 5 to 95%.

The component other than the ethylene-based copolymer [I'] is not limited for the ethylene-based copolymer composition [II], and, for example, a propylene/α-olefin copolymer or propylene-based polymer may be used. The ethylene-based copolymer composition [II] of the present invention is preferably soluble in decane at 140° C. It may be further incorporated with an additive, e.g., inorganic filler. The concrete embodiments of the ethylene-based copolymer composition [II] are described later.

[Propylene-based Copolymer Composition [III]]

The propylene-based copolymer composition [III] of the present invention is characterized by containing the propylene-based copolymer and satisfying the following conditions (c-1) to (c-3).

(c-1) The copolymer contains the component soluble in decane at 64° C. at 1 to 99% by weight which has a temperature ($T_m$) at the maximum peak in the endothermic curve, measured by a differential scanning calorimeter (DSC), of 40 to 90° C., preferably 50 to 90° C.

(c-2) The copolymer contains the component soluble in decane at 64° C. which contains the component soluble in decane at normal temperature at 1 to 70% by weight, preferably 1 to 60%, more preferably 1 to 50%, still more preferably 1 to 30%, still more preferably 1 to 29%.

(c-3) The copolymer contains the component soluble in decane at normal temperature which comprises (i) a recurring unit derived from ethylene and (ii) a recurring unit derived from an α-olefin of 4 or more carbon atoms, at 50 to 75% by mole for the former, preferably 55 to 75%, more preferably 60 to 72%, still more preferably 60 to 70%. The balance comprises the unit derived from an α-olefin of 4 or more carbon atoms. The component soluble in decane at normal temperature may contain the above-described cyclo-olefin, propylene or other compounds at 3% by mole or less as the total content.

The component soluble in decane at normal temperature comprises (i) a recurring unit derived from ethylene and (ii) a recurring unit derived from an α-olefin of 4 or more carbon atoms, and one of the concrete examples of this component is the one for the above-described ethylene-based copolymer [I].

The component insoluble in decane at normal temperature is a polymer containing a recurring unit derived from ethylene and at least one of recurring units derived from an α-olefin and cyclo-olefin of 3 or more carbon atoms. One of the concrete examples of this component is the one for the above-described ethylene-based copolymer [I].

One of the examples of the component soluble in decane at 64° C. but insoluble at normal temperature is the one insoluble at normal temperature for the above-described ethylene-based copolymer [I].

The compounds insoluble in decane at 64° C. include a propylene homopolymer, and copolymer of propylene and ethylene or copolymer of propylene and an α-olefin of 4 to 20 carbon atoms. The α-olefins of 4 to 20 carbon atoms include 1-butene, 1-pentene, 4-methyl-1-pentene, 1-hexene, 1-octene, 1-decene, 1-dodecene, 1-tetradecene, 1-hexadecene, 1-octadecene, and 1-eicosene. The above α-olefin may form a random or block copolymer with propylene. Of the above compounds, the preferable ones are propylene homopolymer, crystalline propylene/ethylene block copolymer having ethylene content at 2 to 40% by mole, and crystalline propylene/ethylene random copolymer having ethylene content at 0.5 to 10% by mole.

The component insoluble in decane at 64° C. has a density normally of 0.885 to 0.910 g/cm$^3$, preferably 0.890 to 0.910 g/cm$^3$, more preferably 0.895 to 0.910 g/cm$^3$.

Moreover, the component insoluble in decane at 64° C. has a refractive index normally of 1.490 to 1.510, preferably 1.495 to 1.510, more preferably 1.500 to 1.510.

The component insoluble in decane at 64° C. is normally preferably soluble in decane at 140° C. The propylene-based copolymer compostion may be further blended with an additive, e.g., inorganic filler.

In the present invention, the decane-insoluble component preferably contains a propylene-derived recurring unit at 90% by mole or more, more preferably 95% or more.

The copolymer composition [III] of the present invention has improved properties, in particular breaking point strength and impact resistance at low temperature, while keeping its inherent rigidity.

The composition of the present invention can be obtained by blending 1 to 99% by weight of the propylene copolymer [C] described later with a total content of 99 to 1% by weight of the above-described polymers [A] and [B], wherein [A]/[B] ratio being kept at 1/99 to 70/30 by weight.

[Ethylene/α-olefin Copolymer Composition]

Next, the ethylene/α-olefin copolymer composition of the present invention is described.

The ethylene/α-olefin copolymer composition of the present invention is composed of the ethylene/α-olefin copolymer [A] at 1 to 70% by weight, preferably 1 to 60%, more preferably 1 to 40%, still more preferably 1 to 30%, still more preferably 3 to 29%, and ethylene-based copolymer [B] at 30 to 99% by weight, preferably 40 to 99%, more preferably 60 to 99%, still more preferably 70 to 99%, still more preferably 71 to 97%, wherein contents of the ethylene/α-olefin copolymer [A] and ethylene-based copolymer [B] total 100% by weight.

Ethylene/α-olefin Copolymer [A]

The ethylene/α-olefin copolymer [A] for the present invention is a copolymer of ethylene and α-olefin of 4 to 20 carbon atoms.

The examples of the α-olefins of 4 to 20 carbon atoms useful for the present invention are those for the above-described ethylene-based copolymers [I].

(A-i) Contents of the Components for the Ethylene/α-olefin Copolymer [A]

The ethylene/α-olefin copolymer [A] contains (a) a recurring unit derived from ethylene at 50 to 70% by mole, preferably 50 to 68%, and (b) a recurring unit derived from an α-olefin of 4 to 20 carbon atoms at 30 to 50% by mole, preferably 32 to 50%. The composition will exhibit excellent blocking properties, when each component is incorporated at the content in the above range.

The ethylene/α-olefin copolymer [A] for the present invention preferably has one of the following properties (A-ii) to (A-iv), more preferably has all of them.

(A-ii) Glass Transition Temperature and Crystallinity

The ethylene/α-olefin copolymer [A] for the present invention has a glass transition temperature of −60° C. or lower, determined by a differential scanning calorimeter (DSC), preferably −65° C. or lower, and a crystallinity of 1% or less, preferably 0.5% or less.

(A-iii) B Value

The ethylene/α-olefin copolymer [A] for the present invention has a B value of 0.9 to 1.5, preferably 1.0 to 1.2, given by the following general formula (1):

$$B\ value=[P_{OE}]/(2[P_E][P_O])\quad(1)$$

wherein, $[P_E]$ is molar fraction of the ethylene-derived recurring unit in the copolymer, $[P_O]$ is molar fraction of the α-olefin-derived recurring unit in the copolymer, and $[P_{OE}]$ is a number ratio of the ethylene/α-olefin copolymer chains to the total dyad chains in the copolymer, determined by the $^{13}$C-NMR spectroscopy.

The B value is an index representing the distributions of ethylene and an α-olefin of 4 to 20 carbon atoms in the ethylene/α-olefin copolymer [A], and can be determined by the methods proposed by, e.g., J. C. Randall (Macromolecules, 15, 353 (1982)) and J. Ray (Macromolecules, 10, 773 (1977)).

As the B value increases, the block chains in the ethylene-based copolymer become shorter, and have more uniform ethylene and α-olefin distributions, therefore copolymer rubber composition distribution becomes narrower. As the B value decreases to below 1.0, the ethylene-based copolymer composition distribution becomes broader, and possibly deteriorates its handling characteristics.

(A-iv) Intrinsic Viscosity

The ethylene/α-olefin copolymer [A] for the present invention has an intrinsic viscosity [η] of 0.1 to 10.0 dl/g, determined in decalin at 135° C., preferably 1 to 8dl/g, more preferably 2 to 7 dl/g.

Moreover, the ethylene/α-olefin copolymer [A] for the present invention has the following properties (A-v) and (A-vi)

(A-v) Density

The ethylene/α-olefin copolymer [A] for the present invention has a density of 0.863 g/cm$^3$ or less, preferably 0.855 to 0.860 g/cm$^3$.

(A-vi) Tαβ/Tαα

The ethylene/α-olefin copolymer [A] for the present invention has a Tαβ/Tαα ratio of 0.5 or less, preferably 0.2 or less, more preferably less than 0.01, where Tαβ and Tαα are intensities determined by the $^{13}$C-NMR spectroscopy.

Tαβ and Tαα in the $^{13}$C-NMR spectroscopy are peak intensities of the two types of $CH_2$, different from each other in the tertiary carbon atom position as shown below, in the recurring unit derived from the α-olefin of 4 or more carbon atoms.

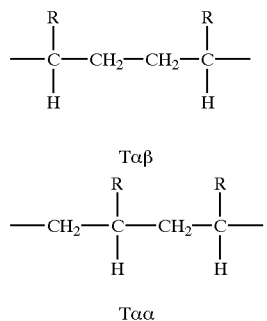

The intensity ratio Tαβ/Tαα can be determined by the following procedure.

First, $^{13}$C-NMR spectroscopy of the ethylene/α-olefin copolymer [A] is measured by an analyzer (e.g., JOEL's JOEL-GX270). The measurement is conducted by using 5% by weight of sample (copolymer) dissolved in a mixed solution of hexachlorobutadiene and d$_6$-benzene (2/1 of the ratio (hexachlorobutadiene/d$_6$-benzene) by volume)at 67.8 MHz and 25° C. with d$_6$-benzene (128 ppm) as the reference. The resultant $^{13}$C-NMR spectral pattern is analyzed by the proposals by Lindemann and Adams (Analysis Chemistry, 43, p1245 (1971)) and J. C. Randall (Review Macromolecular Chemistry Physics, C29, 201 (1989)), to find the Tαβ/Tαα ratio.

The ethylene/α-olefin copolymer [A] can be produced by copolymerization of ethylene and α-olefin of 4 to 20 carbon atoms in the presence of a metallocene catalyst.

Metallocene Catalyst

The metallocene-based catalyst may be composed of a metallocene compound (a), organoaluminumoxy compound (b) and/or compound (c) which reacts with the metallocene compound (a) to form the ion pair. It may be also composed of an organoaluminum compound (d) together wish the compounds (a), (b) and/or (c).

Each of these components is described.
(a) Metallocene Compound

The metallocene compound for the metallocene catalyst used for the present invention is the compound of a transition metal of Group IVB in the periodic table. More concretely, it is represented by the following general formula (2):

$$ML_x \qquad (2)$$

wherein, M is a transition metal of Group IVB in the periodic table, "x" is its valence number, and L is a ligand.

In the general formula (2), a transition metal is zirconium, titanium, hafnium or the like.

In the general formula (2), L is a ligand coordinated with the transition metal, wherein at least one ligand has a cyclopentadienyl skeleton. The ligand of cyclopentadienyl skeleton may have a substituent. The examples of the ligands of cyclopentadienyl skeleton include alkyl- or cycloalkyl-substituted clopentadienyl group, such as cyclopentadienyl, methylcyclopentadienyl, ethylcyclopentadienyl, n- or i-propylcyclopentadienyl, n-, i-, sec- or t-butylcyclopentadienyl, dimethylcyclopentadienyl, methylpropylcyclopentadienyl, methylbutylcyclopentadienyl and methylbenzylcyclopentadienyl group; and indenyl, 4,5,6,7-tetrahydroindenyl and fluorenyl group.

The above group of cyclopentadienyl skeleton may be substituted with a halogen atom or trialkylsilyl group. When the compound represented by the general formula (2) has two or more groups of cyclopentadienyl skeleton as the ligands L, these groups may be bound to each other via an alkylene group such as ethylene or propylene, substituted alkylene group such as isopropylidene or diphenylmethylene, or silylene or substituted silylene group such as dimethylsilylene, diphenylsilylene or methylphenylsilylene.

The examples of the ligand L other than that of cyclopentadienyl skeleton include a hydrocarbon group of 1 to 12 carbon atoms, alkoxy group, aryloxy group, sulfonate-containing group (e.g., —SO$_3$R$^a$, R$^a$ is an alkyl, halogen-substituted alkyl, aryl, or halogen- or alkyl-substituted aryl), and halogen or hydrogen atom.

The examples of hydrocarbon groups of 1 to 12 carbon atoms include an alkyl, cycloalkyl, aryl and aralkyl. More concretely, they include alkyl groups, such as methyl, ethyl, n-propyl, i-propyl, n-butyl, i-butyl, sec-butyl, t-butyl, pentyl, hexyl, octyl, decyl and dodecyl; cycloalkyl groups, such as cyclopentyl and cyclohexyl; aryl groups, such as phenyl and tolyl; and aralkyl groups, such as benzyl and neophyl.

The alkoxy groups include methoxy, ethoxy and propoxy. The aryloxy groups include phenoxy. The sulfonate-containing groups (represented by —SO$_3$R$^a$) include methanesulfonate, p-toluenesulfonate, trifluoromethanesulfonate and p-chlorobenzenesulfonate. The halogen atoms include fluorine, chlorine, bromine and iodine.

More concretely, the metallocene compound represented by the general formula (2) is represented by the following general formula (3), when the transition metal is tetra-valent:

$$R^2{}_k R^3{}_l R^4{}_m R^5{}_n M \qquad (3)$$

wherein, M is a transition metal as is the case with the general formula (2); R$^2$ is a group (ligand) of cyclopentadienyl skeleton; R$^3$, R$^4$ and R$^5$ are each a group (ligand) with or without cyclopentadienyl skeleton; "k" is an integer of 1 or more; and (k+l+m+n)=4.

The examples of the metallocene compound (a) include bis(cyclopentadienyl) zirconium dichloride,
bis(methylcyclopentadienyl) zirconium dichloride,
bis(ethylcyclopentadienyl) zirconium dichloride,
bis(n-propylcyclopentadienyl) zirconium dichloride,
bis(n-butylcyclopentadienyl) zirconium dichloride,
bis(n-hexylcyclopentadienyl) zirconium dichloride,
bis(methyl-n-propylcyclopentadienyl) zirconium dichloride,
bis(methyl-n-butylcyclopentadienyl) zirconium dichloride,
bis(dimethyl-n-butylcyclopentadienyl) zirconium dichloride,
bis (n-butylcyclopentadienyl) zirconium dibromide,
bis(n-butylcyclopentadienyl) zirconium methoxy chloride,
bis(n-butylcyclopentadienyl) zirconium ethoxy chloride,
bis(n-butylcyclopentadienyl) zirconium butoxy chloride,
bis(n-butylcyclopentadienyl) zirconium ethoxide,
bis(n-butylcyclopentadienyl) zirconium methyl chloride,
bis (n-butylcyclopentadienyl) zirconium dimethyl,
bis(n-butylcyclopentadienyl) zirconium benzyl chloride,
bis(n-butylcyclopentadienyl) zirconium dibenzyl,
bis(n-butylcyclopentadienyl) zirconium phenyl chloride, and
bis(n-butylcyclopentadienyl) zirconium hydride chloride.
Each of these compounds may be substituted at two positions, or 1,2- and 1,3-positions.

The above metallocene compound (a) may have zirconium substituted by titanium or hafnium.

Moreover, at least two of R$^2$, R$^3$, R$^4$ and R$^5$ (e.g., R$^2$ and R$^3$) in the above general formula (3) for the metallocene compound (a) may be groups (ligands) of cyclopentadienyl skeleton. In this case, the metallocene compound (a) may be of bridge type in which these groups are bound to each other via an alkylene, substituted alkylene, silylene or substituted silylene group, and R$^4$ and R$^5$ are each the ligand L other than that of cyclopentadienyl skeleton, as described in the explanation of the general formula (2).

The examples of the bridge type metallocene compound (a) include
ethylenebis(indenyl)dimethyl zirconium,
ethylenebis(indenyl) zirconium dichloride,
isopropylidene(cyclopentadienyl-fluorenyl) zirconium dichloride,
diphenylsilylenebis(indenyl) zirconium dichloride,
methylphenylsilylenebis(indenyl) zirconium dichloride,
and a metallocene compound represented by the general formula (4), disclosed by Japanese Patent Laid-Open Publication No. 268307/1992.

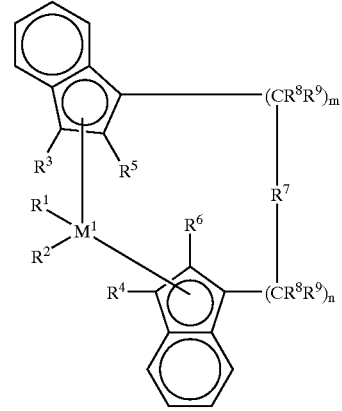

(4)

M$^1$ in the general formula (4) is a Group IVB metal in the periodic table, e.g., titanium, zirconium or hafnium. In the general formula (4), R$^1$ and R$^2$ may be the same or different.

More concretely, $R^1$ and $R^2$ are each hydrogen atom; an alkyl group of 1 to 10, preferably 1 to 3, carbon atoms; alkoxy group of 1 to 10, preferably 1 to 3, carbon atoms; aryl group of 6 to 10, preferably 6 to 8, carbon atoms; aryloxy group of 6 to 10, preferably 6 to 8, carbon atoms; alkenyl group of 2 to 10, preferably 2 to 4, carbon atoms; aryloxy group of 7 to 40, preferably 7 to 10, carbon atoms; alkylaryl group of 7 to 40, preferably 7 to 12, carbon atoms; arylalkenyl group of 8 to 40, preferably 8 to 12, carbon atoms; or halogen atom, preferably chlorine.

In the above general formula (4), $R^3$ and $R^4$ are each hydrogen atom; a halogen atom, preferably fluorine, chlorine or bromine; alkyl group of 1 to 10, preferably 1 to 4, carbon atoms, which may be halogenated; aryl group of 6 to 10, preferably 6 to 8, carbon atoms; or group represented by $-N(R^{10})_2$, $-SR^{10}$, $-OSi(R^{10})_3$, $-Si(R^{10})_3$ or $-P(R)_2$. $R^{10}$ is a halogen atom, preferably chlorine; alkyl group of 1 to 10, preferably 1 to 3, carbon atoms; or aryl group of 6 to 10, preferably 6 to 8, carbon atoms. $R^3$ and $R^4$ may be the same or different, especially preferably hydrogen atom.

In the above general formula (4), each of $R^5$ and $R^6$ may be the same as $R^3$ or $R^4$ except hydrogen atom. $R^5$ and $R^6$ may be the same or different, preferably the same. $R^5$ and $R^6$ are preferably each an alkyl group of 1 to 4 carbon atoms, or halogen-substituted alkyl group, more concretely methyl, ethyl, propyl, i-propyl, butyl, i-butyl or trifluoromethyl, of which methyl is more preferable.

In the above general formula (4), $R^7$ is represented by

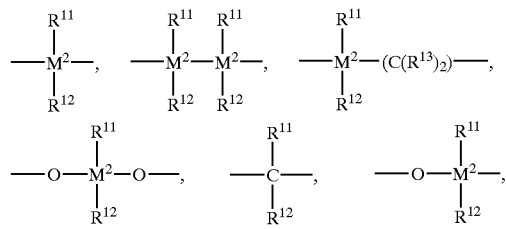

$-B(R^{11})-$, $Al(R^{11})$, $-Ge$, $-Sn-$, $-O-$, $-S-$, $=SO-$, $=SO_2$, $-N(R^{11})-$, $=CO$, $P(R^{11})-$ or $P(O)(R^{11})-$.

$R^{11}$, $R^{12}$ and $R^{13}$ are each hydrogen atom; a halogen atom; alkyl group of 1 to 10, preferably 1 to 4, carbon atoms, more preferably methyl; fluoroalkyl group of 1 to 10, preferably $CF_3$; fluoroaryl group of 6 to 10 carbon atoms, preferably pentafluorophenyl; alkoxy group of 1 to 10, preferably 1 to 4, carbon atoms, more preferably methoxy; alkenyl group of 2 to 10, preferably 2 to 4, carbon atoms; arylalkyl group of 7 to 40, preferably 7 to 10, carbon atoms; arylalkenyl group of 8 to 40, preferably 8 to 12, carbon atoms; or alkylaryl group of 7 to 40, preferably 7 to 12, carbon atoms.

"$R^{11}$ and $R^{12}$" or "$R^{11}$ and $R^{13}$" may form a ring with the atom to which they are bound. $R^{11}$, $R^{12}$ and $R^{13}$ may be the same or different.

$M^2$ is silicon, germanium or tin, preferably silicon or germanium. $R^7$ is $-C(R^{11})(R^{12})-$, $Si(R^{11})(R^{12})-$, $Ge(R^{11})(R^{12})-$, $-O-$, $-S-$, $=SO$, $P(R^{11})-$ or $-P(O)(R^{11})-$.

In the above general formula (4), $R^8$ and $R^9$ may be the same as $R^{11}$, and also may be the same as or different from each other. In the above general formula (4), "m" and "n" are each 0, 1 or 2, preferably 0 or -1; "m+n" is 0, 1 or 2, preferably 0 or 1; wherein "m" and "n" may be the same or different.

The metallocene compound (a) represented by the general formula (3) may be also rac-ethylene(2-methyl-1-indenyl)-2-zirconium dichloride or rac-dimethylsilylene(2-methyl-1-indenyl)-2-zirconium dichloride.

These metallocene compound (a) represented by the general formula (3) can be produced by a known process, e.g., the one disclosed by Japanese Patent Laid-Open Publication No. 268307/1992.

The metallocene compound (a) represented by the general formula (3) may be the one represented by the following general formula (5):

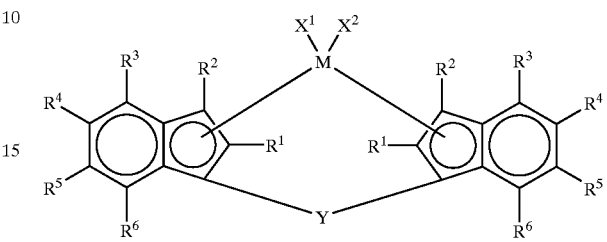

(5)

In the above general formula (5), M is a Group IVB metal in the periodic table, e.g., titanium, zirconium or hafnium. In the general formula (5), $R^1$ and $R^2$ are each hydrogen atom; a halogen atom; hydrocarbon group of 1 to 20 carbon atoms; halogenated hydrocarbon group of 1 to 20 carbon atoms; or silicon-containing, oxygen-containing, sulfur-containing, nitrogen-containing or phosphorus-containing group. More concretely, $R^1$ and $R^2$ are each a halogen atom, e.g., fluorine, chlorine, bromine or iodine;

hydrocarbon group of 1 to 20 carbon atoms, such as alkyl group, e.g., methyl, ethyl, propyl, butyl, hexyl, cyclohexyl, oxtyl, nonyl, dodecyl, eicosyl, norbornyl or adamantyl; alkenyl group, e.g., vinyl, propenyl or cyclohexenyl; arylalkyl group, e.g., benzyl, phenylethyl or phenylpropyl; or aryl group, e.g., phenyl, tolyl, dimethylphenyl, trimethylphenyl, ethylphenyl, propylphenyl, biphenyl, naphthyl, methylnaphthyl, anthryl or phenanthryl;

silicon-containing group, such as mono-hydrocarbon-substituted silyl, e.g., methylsilyl or phenylsilyl; di-hydrocarbon-substituted silyl; tri-hydrocarbon-substituted silyl, e.g, trimethylsilyl, triethylsilyl, tripropylsilyl, tricyclohexylsilyl, triphenylsilyl, dimethylphenylsilyl, methyldiphenylsilyl, tritolylsilyl or tri-naphthylsilyl; ether of hydrocarbon-substituted silyl, e.g., trimethylsilyl ether; silicon-substituted alkyl, e.g., trimethylsilylmethyl; or silicon-substituted aryl, e.g., trimethylsilylphenyl;

oxygen-containing group, such as alkoxy, e.g., hydroxy, methoxy, ethoxy, propoxy or butoxy; aryloxy, e.g., phenoxy, methylphenoxy, dimethylphenoxy or naphthoxy; or arylalkoxy, e.g., phenylmethoxy or phenylethoxy;

sulfur-containing group, such as the above-described oxygen-containing group substituted with sulfur;

nitrogen-containing group, such as alkylamino group, e.g., amino, methylamino, dimethylamino, diethylamino, dipropylamino, dibutylamino or dicyclohexylamino; arylamino group, e.g., phenylamino, diphenylamino, ditolylamino, dinaphthylamino or methylphenylamino; or alkylarylamino; or phosphorus-containing group, such as dimethylphosphino or diphenylphosphino.

Of these, a hydrocarbon group is preferable, especially alkyl of 1 to 3 carbon atoms, e.g., methyl ethyl or propyl. $R^3$, $R^4$, $R^5$ and $R^6$ are each hydrogen atom; a halogen atom; hydrocarbon group of 1 to 20 carbon atoms; halogenated hydrocarbon group of 1 to 20 carbon atoms. Each may be the same as each of $R^1$ and $R^2$ described above.

At least one of the pairs of $R^3$ and $R^4$, $R^4$ and $R^5$, and $R^5$ and $R^6$ may be bound to each other to form a monocyclic aromatic ring, and the ligands containing the aromatic ring include those represented by the following general formulae (6) to (8):

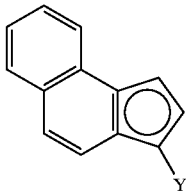

(6)

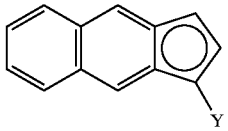

(7)

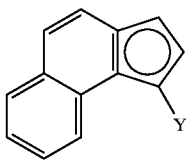

(8)

When the metallocene compound (a) represented by the general formula (5) has two or more of $R^3$, $R^4$, $R^5$ and $R^6$ as hydrocarbon or halogenated hydrocarbon groups, other than those forming an aromatic ring, they may be bound to each other to form a ring. When $R^6$ is a substituent other than aromatic group, it is preferably hydrogen atom.

In the general formula (5), $X^1$ and $X^2$ are each hydrogen atom; an halogen atom; hydrocarbon group of 1 to 20 carbon atoms; halogenated hydrocarbon group of 1 to 20 carbon atoms; or oxygen- or sulfur-containing group.

The concrete examples of the halogen atom, hydrocarbon group of 1 to 20 carbon atoms, halogenated hydrocarbon group of 1 to 20 carbon atoms and oxygen-containing group are the same as the above-described $R^1$ or $R^2$.

The examples of the sulfur-containing group include, in addition to those represented by $R^1$ or $R^2$, sulfonate groups, e.g., methylsulfonate, trifluoromethanesulfonate, phenylsulfonate, benzylsulfonate, methylsulfonate, p-toluenesulfonate, trimethylbenzenesulfonate, triisobutylbenzenesulfonate, p-chlorobenzenesulfonate and pentafluorobenzenesulfonate; and sulfinate groups, e.g., methylsulfinate, phenylsulfinate, benzenesulfinate, p-toluenesulfinate, trimethylbenzenesulfinate and pentafluorobenzenesulfinate.

In the general formula (5), Y is a divalent hydrocarbon group of 1 to 20 carbon atoms; divalent halogenated hydrocarbon group of 1 to 20 carbon atoms; divalent silicon-containing group; di valent germanium-containing group; divalent tin-containing group; or —O—, —CO—, —S—, —SO—, —SO$_2$—, —NR$^7$—, P(R$^7$)—, P(O)(R$^7$)—, BR$^7$— or —AlR$^7$— (R$^7$ is hydrogen atom, a halogen atom, hydrocarbon group of 1 to 20 carbon atoms, or halogenated hydrocarbon group of 1 to 20 carbon atoms).

The concrete examples of Y include alkylene, e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene, e.g., diphenylmethylene and diphenyl-1,2-ethylene, of 1 to 20 carbon atoms;

the above described hydrocarbon group of 1 to 20 carbon atoms which is halogenated;

divalent silicon-containing group such as alkylsilylene, e.g., methylsilylene, dimethylsilylene, diehylsilylene, di(n-propyl)silylene, di(i-propyl)silylene, di(cyclohexyl)silylene, methylphenylsilylene, diphenylsilylene, di(p-tolyl)silylene, and di(p-chlorophenyl)silylene; alkyldisilylene, e.g., alkylarylsilylene, arylsilylene, tetramethyl-1,2-disilylene and tetraphenyl-1,2-disilylene; and alkylaryldisilylene and aryldisilylene;

divalent germanium-containing group which is the above-described divalent, silicon-containing group whose silicon is substituted with germanium; and divalent tin-containing group which is the above-described divalent, silicon-containing group whose silicon is substituted with tin.

Of these, divalent silicon-, germanium and tin-containing groups are preferable, divalent silicon-containing one is more preferable, and alkylsilylene, alkylarylsilylene and arylsilylene are still more preferable.

For the compound represented by The general formula (5), a group $R^3$ and one of $R^4$ to $R^6$ are preferably an alkyl group of 1 to 20 carbon atoms, more preferably $R^3$ and $R^5$, and $R^3$ and $R^6$. The above alkyl group is preferably secondary or tertiary, and may be substituted with a halogen atom or silicon-containing group. The examples of the halogen atom and silicon-containing group include the halogen atoms or substituents described in the $R^1$ or $R^2$. Moreover, each of $R^4$ to $R^6$ is preferably hydrogen atom, when it is not an alkyl group. The alkyl groups of 1 to 20 carbon atoms include straight-chain or cycloalkyl groups, such as methyl, ethyl, n-propyl, i-propyl, n-butyl, i-butyl, sec-butyl, tert-butyl, pentyl, hexyl, cyclohexyl, heptyl, oxtyl, nonyl, dodecyl, eicosyl, norbornyl and adamantyl; alkenyl group, such as vinyl, propenyl or cyclohexenyl; arylalkyl group, such as benzyl, phenylethyl, phenylpropyl, or tolylmethhyl. They may contain a double or triple bond. Moreover, two groups of $R^3$, $R^4$, $R^5$ and $R_6$ may be cound to each other to form a monocyclic or polycyclic ring other than aromatic ring.

More concretely, these metallocene compounds (a) include
rac-dimethylsilylene-bis(4,7-dimethyl-1-indenyl) zirconium dichloride,
rac-dimethylsilylene-bis(2,4,7-trimethyl-1-indenyl) zirconium dichloride, and rac-dimethylsilylene-bis(2,4,6-trimethyl-1-indenyl) zirconium dichloride.

The above metallocene compound (a) may have zirconium substituted with titanium or hafnium.

The above metallocene compound (a) is normally racemic, but may be of R or S type.

Of the metallocene compounds (a) represented by the general formula (5), those which can preferably used include the ones whose $R^3$ group is an aryl group of 6 to 16 carbon atoms, such as phenyl, α-naphthyl, β-naphthyl, anthryl, phenanthryl, pyrenyl, acetonaphthyl, phenalenyl (perinaphthenyl), or aceanthrenyl. These aryl groups may be substituted with a halogen atom; hydrocarbon group of 1 to 20 carbon atoms or halogenated hydrocarbon group of 1 to 20 carbon atoms, similar to $R^1$ described above. The especially preferable substituents are phenyl and naphthyl.

The concrete examples of these metallocene compounds include
rac-dimethylsilylene-bis(4-phenyl-1-indenyl) zirconium dichloride,
rac-dimethylsilylene-bis(2-methyl-4-phenyl-1-indenyl) zirconium dichloride,
rac-dimethylsilylene-bis(2-methyl-4-(α-naphthyl)-1-indenyl) zirconium dichloride,
rac-dimethylsilylene-bis(2-methyl-4-(β-naphthyl)-1-indenyl) zirconium dichloride, and rac-dimethylsilylene-bis(2-methyl-4-(1-anthracenyl)-1-indenyl) zirconium dichloride.

The above metallocene compound may have zirconium substituted by titanium or hafnium. Moreover, it may be substituted with a transition metal compound represented by the following general formula (9):

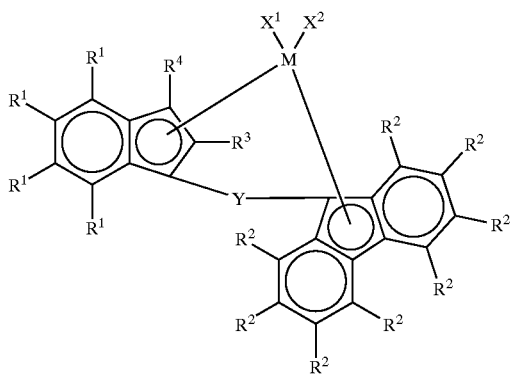

(9)

wherein, M is a Group IVB transition metal in the periodic table, more concretely titanium, zirconium or hafnium.

In the general formula (9), $R^1$s may be the same or different, wherein at least one of them is an aryl of 11 to 20 carbon atoms; arylalkyl of 12 to 40 carbon atoms, arylalkenyl of 13 to 40 carbon atoms, alkylaryl of 12 to 40 carbon atoms, or silicon-containing group; or two adjacent $R^1$s form a monocyclic or polycyclic aromatic or aliphatic group together with the carbon atom which connects them to each other. The whole ring formed by R's has 4 to 20 of carbons including the carbon atom which is bonded with R'.

The examples of the two adjacent $R^1$s forming a monocyclic or polycyclic aromatic or aliphatic group together with the carbon atom which connects them to each other include condensed phenyl, condensed cyclohexyl, condensed cyclopentadienyl, condensed dihyrocyclopentadienyl, condensed indenyl, condensed tetrahydroindenyl, condensed fluorenyl, condensed tetrahydrofluorenyl, and condensed octahydrofluorenyl. These groups may be substituted with a straight-chain or cyclic alkyl, halogen atom, halogen-substituted alkyl, aryl, or silicon-, oxygen-, nitrogen- or phosphorus-containing group.

$R^1$ other than that forming an aryl, arylalkyl, arylalkenyl, alkylaryl group, or aromatic or aliphatic ring is hydrogen atom, a halogen atom, alkyl of 1 to 10 carbon atoms or silicon-containing group.

The aryl groups of 11 to 20 carbon atoms include biphenylyl, anthryl and phenanthryl; arylalkyl groups of 12 to 40 carbon atoms include phenanthrylmethyl, phenanthrylethyl and phenanthrylpropyl; arylalkenyl groups of 13 to 40 carbon atoms include biphenylphenanthryl; alkylaryl groups of 12 to 40 carbon atoms include methylphenanthryl, ethylphenanthryl and propylphenanthryl; halogen atoms include fluorine, chlorine, bromine and iodine; and alkyl groups of 1 to 10 carbon atoms include methyl, ethyl, propyl, butyl, hexyl, cyclohexyl, octyl and nonyl.

The silicon-containing groups include methylsilyl, phenylsilyl, dimethylsilyl, diethylsilyl, diphenylsilyl, trimethylsilyl, triethylsilyl, tripropylsilyl, tricyclohexylsilyl, triphenylsilyl, dimethylphenylsilyl, methyldiphenylsilyl, tritolylsilyl, and trinaphthylsilyl.

The alkyl, aryl, arylalkyl, arylalkenyl and alkylaryl groups may be substituted with a halogen atom. $R^2$s may be the same or different, and are each hydrogen atom; a halogen atom, alkyl group of 1 to 10, carbon atoms; aryl group of 6 to 20 carbon atoms; alkenyl group of 2 to 10 carbon atoms; arylalkyl group 7 to 40 carbon atoms; arylalkenyl group of 8 to 40 carbon atoms; alkylaryl group of 7 to 40 carbon atoms; or silicon-, oxygen-, nitrogen- or phosphorus-containing group.

Of the groups represented by $R^2$, two adjacent groups may form a monocyclic or polycyclic aromatic or aliphatic group together with the carbon atom which connects them to each other. In this case, the ring formed by $R^2$ has 4 to 20 carbon atoms, including the one bound to $R^2$, and $R^2$ other than that forming the aromatic or aliphatic ring is hydrogen atom, a halogen atom, alkyl of 1 to 10 carbon atoms or silicon-containing group.

The group in which two groups represented by $R^2$ form a monocyclic or polycyclic aromatic or aliphatic group include those having a fluorenyl group of the following structure:

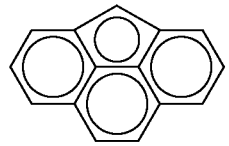

The examples of the alkyl group of 1 to 10 carbon atoms and halogen atom include those described earlier.

The aryl groups of 6 to 20 carbon atoms include phenyl, biphenyl, α- and β-naphthyl, anthmethylnaphthyl, anthryl, and phenanthryl.

The arylalkyl groups of 7 to 40 carbon atoms include benzyl, phenylethyl, phenylpropyl, phenanthrylmethyl, phenanthrylethyl and phenanthrylpropyl.

The arylalkenyl groups of 8 to 40 carbon atoms include styryl and vinyl phenylethyl.

The alkylaryl groups of 7 to 40 carbon atoms include tolyl, dimethylphenyl, trimethylphenyl, ethylphenyl, propylphenyl, methylnaphthyl, methylphenanthryl, ethylphenanthryl and propylphenanthryl.

The alkenyl groups of 2 to 10 carbon atoms include vinyl, propenyl and cyclohexenyl.

The silicon-containing groups include those described earlier.

The oxygen-containing groups include alkoxy, e.g., hydroxy, methoxy, ethoxy, propoxy and butoxy; aryloxy, e.g., phenoxy, methylphenoxy, dimethylphenoxy and naphthoxy; and arylalkoxy, e.g., phenylmethoxy and phenylethoxy.

The sulfur-containing groups include, in addition to the oxygen-containing groups whose oxygen atom is substituted with sulfur, and sulfonate groups, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and penlafluorobenzenesulfonate; and sulfinate groups, such as methylsulfinate, phenylsulfinate, benzylsulfinate, p-toluenesulfinate, trimethylbenzenesulfinate and pentafluorobenzenesulfinate; and sulfinate groups.

The nitrogen-containing groups include alkylamino groups such as amino, methylamino, dimethylamino, diethylamino, dipropylamino, dibutylamino and dicyclohexylamino; arylamino groups and alkylarylamino such as phenylamino, diphenylamino, ditolylamino, dinaphthylamino or methylphenylamino.

The phosphorus-containing groups include dimethylphosphino and diphenylphosphino.

Of these, $R^2$ is preferably hydrogen atom and an alkyl group, more preferably hydrogen atom and an alkyl group of 1 to 3 carbon atoms, such as methyl ethyl or propyl.

As the fluorenyl group having an $R^2$ as the substituent, 2,7-dialkyl-fluorenyl group is cited as the preferable one, and the examples of alkylgrow constituted 2,7-dialkyl are an alkyl of 1 to 5 carbon atoms.

$R^1$ and $R^2$ may be the same or different. $R^3$ and $R^4$ may be also the same or different. More concretely, $R^3$ and $R^4$ are each hydrogen atom; a halogen atom; alkyl group of 1 to 10 carbon atoms; aryl group of 6 to 20 carbon atoms; alkenyl group of 2 to 10 carbon atoms; arylalkyl group of 7 to 40 carbon atoms; arylalkenyl group of 8 to 40 carbon atoms; alkylaryl group of 7 to 40 carbon atoms; and silicon-containing, oxygen-containing, sulfur-containing, nitrogen-containing or phosphorus-containing groups, as is the case described earlier.

Of these, at least one of $R^3$ and $R^4$ is an alkyl of 1 to 3 carbon atoms.

$X^1$ and $X^2$ may be also the same or different, and are each hydrogen atom; an halogen atom; hydrocarbon group of 1 to 20 carbon atoms; halogenated hydrocarbon group of 1 to 20 carbon atoms; oxygen-, sulfur- or nitrogen-containing group; or a conjugated diene residue formed by $X^1$ and $X^2$. More concretely, the halogen atoms, and oxygen-, sulfur- and nitrogen-containing groups are similar to the atoms and groups as described earlier.

The hydrocarbon groups of 1 to 20 carbon atoms include alkyl groups, e.g., methyl, ethyl, propyl, butyl, hexyl, cyclohexyl, octyl, nonyl, dodecyl, eicosyl, norbornyl and adamantyl; alkenyl groups, e.g., vinyl, propenyl and cyclohexenyl; arylalkyl groups, e.g., benzyl, phenylethyl and phenylpropyl; and aryl group, e.g., phenyl, tolyl, dimethylphenyl, trimethylphenyl, ethyiphenyl, propylphenyl, α- or β-naphthyl, methylnaphthyl, anthryl, phenanthryl, benzylphenyl, pyrenyl, acenaphthyl, phenalenyl, aceanthrenyl, tetrahydronaphthyl, indanyl and biphenyleny. The halogenated hydrocarbon groups of 1 to 20 carbon atoms include the above-described hydrocarbon groups of 1 to 20 carbon atoms which are substituted with a halogen atom.

The examples of the conjugated diene residue formed by $X^1$ and $X^2$ include $\eta^4$-1,4-diphenyl-1,3-butadiene, $\eta^4$-1,3-butadiene, $\eta^4$-1,4-dibenzyl-1,3-butadiene, $\eta^4$-1-phenyl-1,3-pentadiene, $\eta^4$-3-methyl-1,3-pentadiene, $\eta^4$-1,4-bis(trimethylsilyl)-1,3-pentadiene, 2,3-dimethylbutadiene, $\eta^4$-2,4-hexadiene, and isoprene.

The preferable examples of the conjugated diene residue formed by $X^1$ and $X^2$ include those of 1,3-butadiene, 2,4-hexadiene, 1-phenyl-1,3-pentadiene and 1,4-diphenylbutadiene, which may be substituted with a hydrocarbon group of 1 to 10 carbon atoms.

Of these as $X^1$ and $X^2$, a halogen atom, hydrocarbon group of 1 to 20 carbon atoms or sulfur-containing group is preferable. Y is a divalent hydrocarbon group of 1 to 20 carbon atoms; divalent halogenated hydrocarbon group of 1 to 20 carbon atoms; divalent silicon-containing group; divalent germanium-containing group; divalent tin-containing group; or —O—, —CO—, —S—, —SO—, —SO$_2$—, —NR$^5$—, P(R$^5$)—, P(O)(R$^5$)—, BR$^5$— or —AlR$^5$— (R$^5$ is hydrogen atom, a halogen atom, hydrocarbon group of 1 to 20 carbon atoms, or halogenated hydrocarbon group of 1 to 20 carbon atoms)

The concrete examples of Y include divalent hydrocarbon group having 1 to 20 carbon atoms such as alkylene, e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene, e.g., diphenylmethylene and diphenyl-1,2-ethylene;

the above described hydrocarbon group of 1 to 20 carbon atoms which is halogenated;

divalent silicon-containing group such as alkylsilylene, e.g., methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene, and di(p-chlorophenyl)silylene; alkylarylsilylene; arylsilylene; alkyldisilylene, e.g., tetramethyl-1,2-disilylene and tetraphenyl-1,2-disilylene; and alkylaryldisilylene and aryldisilylene;

divalent germanium-containing group which is the above-described divalent, silicon-containing group whose silicon is substituted with germanium; and divalent tin-containing group which is the above-described divalent silicon-containing group whose silicon is substituted with tin.

Of these divalent groups, the preferable ones have the shortest bonding section is composed of 1 or 2 atoms for —Y—, represented by the general formula (I). $R^5$ is a halogen atom, hydrocarbon group of 1 to 20 carbon atoms or halogenated hydrocarbon group of 1 to 20 carbon atoms, similarly to the one described earlier.

Of these groups, —Y— is preferably a divalent hydrocarbon group of 1 to 5 carbon atoms, and divalent silicon- and germanium-containing groups, more preferably divalent silicon-containing group, still more preferably alkylsilylene, alkylarylsilylene and arylsilylene.

The above-described zirconium compound may have zirconium substituted with titanium or hafnium.

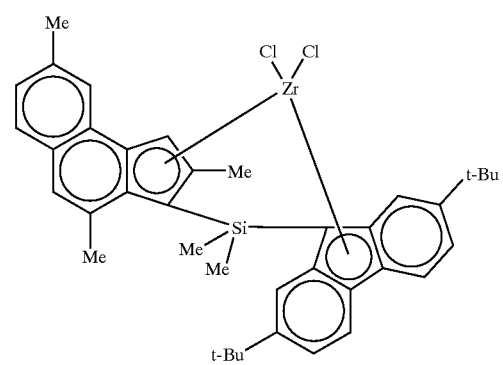

Me:Methyl group
t-Bu:t-butyl group

Of the above-described zirconium compounds, dimethylsilylene(2,7-dimethyl-4,5-(2-methyl-benzo)-1-indenyl)(2,7-di-t-butyl-9-fluorenyl) zirconium dichloride, for example, has the following structure.

Another example is dimethylsilylene(2,6-dimethyl-4,5-(1-methyl-benzo)-1-indenyl)(2,7-di-t-butyl-9-fluorenyl) zirconium dichloride, whose structure is shown below.

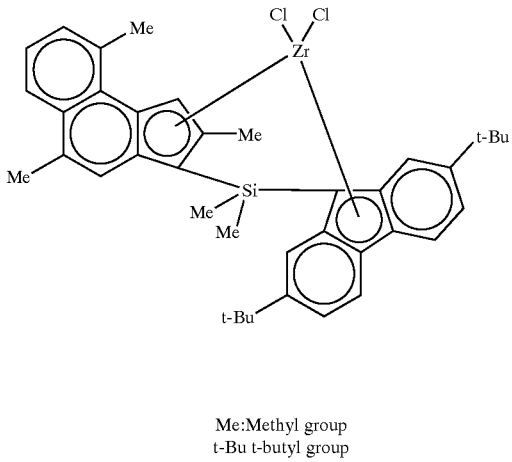

Me:Methyl group
t-Bu t-butyl group

These catalyst can be synthesized by the method proposed by the inventors of this invention, disclosed by Japanese Patent File No. 187563/1996 (Japanese Patent Laid-Open Publication No. 235313/1997).

A metallocene compound (a) represented by the following general formula (10) may be also used for the present invention:

$$L^a MX_2 \tag{10}$$

wherein, M is a Group IV or lanthanide metal in the periodic table; $L^a$ is a derivative of nonlocalized $\pi$ bonding group, which imparts a constrained geometric shape to the active site of the metal M; and X's are each hydrogen, a halogen, hydrocarbon group containing 20 atoms or less of carbon, silicon or germanium, or silyl or germyl group.

Of the compounds represented by the general formula (10), the compounds represented by the following general formula (11) are preferable:

wherein, M is titanium, zirconium or hafnium; X is the same as that for the general formula (10); Cp is a substituted cyclopentadienyl group with a substituent Z and bound to M through the $\pi$ bonding; Z is oxygen, sulfur, boron or a Group IVA element in the periodic table, e.g., silicon, germanium or tin; and Y is a logand containing nitrogen, phosphorus, oxygen or sulfur, wherein Z and Y may together form a condensed ring.

The compounds represented by the general formula (11) include (dimethyl)(t-butylamide)(tetramethyl-$\eta^5$-cyclopentadienyl)silane) titanium dichloride, and ((t-butylamide) (tetramethyl-$\eta^5$-cyclopentadienyl)-1,2-ethanediyl) titanium dichloride. The above metallocene compounds may have titanium substituted by zirconium or hafnium. Of the metallocene compounds (a) represented by the general formula (10) or (11), those preferably used ones include zirconocene compounds having zirconium as the metal atom at the center and a ligand containing at least 2 cyclopentadienyl skeletons.

The metallocene compounds (a) represented by the general formula (4) or (5) preferably have titanium as the metal atom at the center.

These metallocene compounds may be used either individually or in combination for the present invention. The metallocene compound (a) may be diluted with a hydrocarbon or halogenated hydrocarbon for use. It may be also used after being brought into contact with a carrier.

The carriers useful for the present invention are of inorganic or organic compounds in the form of solid, granules or fine particles, of 10 to 300 µm in size, preferably 20 to 200 µm. Of these inorganic carriers, porous oxides are preferable. The concrete examples include $SiO_2$, $Al_2O_3$, MgO, $ZrO_2$, $TiO_2$, $B_2O_3$, CaO, ZnO, BaO, $ThO_2$ and a mixture thereof, e.g., $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO. Of these, more preferable ones have at least one of $SiO_2$ and $Al_2O_3$ as the main component.

The above inorganic oxide may be incorporated with a small quantity of carbonate, sulfate, nitrate or oxide, e.g., $Na_2CO_3$, $K_2CO_3$, $CaCO_3$, $MgCO_3$, $Na_2SO_4$, $Al_2(SO_4)_3$, $BaSO_4$, $KNO_4$, $Mg(NO_3)_2$, $Al_2(NO_3)_3$, $Na_2O$, $K_2O$, or $Li_2O$.

These carriers suitably used for the present invention have a specific surface area of 50 to 1000 m²/g, preferably 100 to 700 m²/g, and pore volume of 0.3 to 2.5 m²/g, although having varying properties depending on type and method by which they are produced. They may be fired, as required, at 100 to 1000° C., preferably 150 to 700° C. before being used.

The carrier for the present invention may be also of a solid organic compound, granules or fine particles, having a particle size of 10 to 300 µm. The concrete examples include polymers or copolymers produced from an α-olefin of 2 to 14 carbon atoms as the main component, e.g., ethylene, propylene, 1-butene and 4-methyl-1-pentene, or polymers or copolymers produced from vinyl cyclohexene or styrene as the main component.

Organoaluminumoxy Compound (b)

Next, the organoaluminumoxy compound (b) used for producing a metallocene-based catalyst is described.

The organoaluminumoxy compound (b) useful for the present invention may be a known aluminoxane or benzene-insoluble organoalumnumoxy compound (b).

More concretely, the known aluminoxanes are represented by the following general formula (12) or (13):

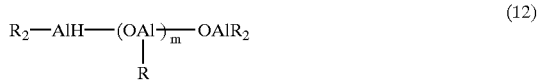

wherein, R is a hydrocarbon group, e.g., methyl, ethyl, propyl or butyl, preferably methyl or ethyl, more preferably methyl; and "m" is an integer of 2 or more, preferably 5 to 40.

The aluminoxane represented by the general formula (12) or (13) may be formed by a mixture of alkyloxy aluminum units represented by the general formulae (OAl($R^1$) and (OAl($R^2$), wherein $R^1$ and $R^2$ are similar to those represented by R, but different from each other.

The organoaluminumoxy compound (b) useful for the present invention may be contained with a small quantity of organometallic compound of a metal other than aluminum. The above-described aluminoxanes can be produced by, e.g., one of the following method:

(1) To suspend in which a compound containing adsorbed water or a salt containing bonding water, e.g., magnesium chloride hydrate, copper sulfate hydrate, aluminum sulfate hydrate, nickel sulfate hydrate or cerium sulfate hydrate, are suspended in a hydrocarbon solvent, organoaluminum compound is added, thereby the organoaluminum compound is reacted with the compound containing absorbed water or the salt containing bonding water, e.g., trialkyl aluminum, and then the product is recovered as the solution of hydrocarbon.

(2) An organoaluminum compound, e.g., trialkyl aluminum, is directly reacted with water, ice or steam in a solvent, e.g., benzene, toluene, ethyl ether or tetrahydrofuran, and the product is recovered as the solution of hydrocarbon.

(3) An organoaluminum compound, e.g., trialkyl aluminum, is reacted with an organotin oxide, e.g., dimethyl tin oxide or dibutyl tin oxide, in a solvent, e.g., decane, benzene or toluene.

The alumoxane may contain a small quantity of an organometallic component. The aluminoxane may be redissolved in a solvent, after the solution recovered is distilled to remove the solvent and unreacted organoaluminum compound.

The concrete examples of the organoaluminum compounds useful for production of the aluminoxane include trialkyl aluminum, such as trimethyl aluminum, triethyl aluminum, tripropyl aluminum, triisopropyl aluminum, tri-n-butyl aluminum, triisobutyl aluminum, tri-sec-butyl aluminum, tri-tert-butyl aluminum, tripentyl aluminum, trihexyl aluminum, trioctyl aluminum, and tridecyl aluminum; tricycloalkyl aluminum, such as tricyclohexyl aluminum and tricyclooctyl aluminum;

dialkyl aluminum halide, such as dimethyl aluminum chloride, diethyl aluminum chloride, diethyl aluminum bromide, and diisobutyl aluminum chloride;

dialkyl aluminum hydride, such as diethyl aluminum hydride and diisobuty aluminum hydride; dialkyl aluminum alkoxide, such as dimethyl aluminum methoxide and diethyl aluminum methoxide;

dialkyl aluminum aryloxide, such as diethyl aluminum phenoxide.

Of these, trialkyl aluminum and tricycloalkylaluminum are particularly preferable.

The isoprenyl aluminum represented by the following general formula (14) is also the organoaluminum compound which can be used for the present invention:

(14)

wherein, "x", "y" and "z" are each a positive numeral, and $z \geq 2x$.

The above organoaluminum compounds may be used either individually or in combination. The solvents useful for preparation of the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosene and gas oil; and halides of the above aromatic, aliphatic and alicyclic hydrocarbons, in particular chlorides and bromides. The other useful compounds include ethers, e.g., ethyl ether and tetrahydrofuran. Of these solvents, aromatic hydrocarbons are more preferable.

The above benzene-insoluble organoaluminumoxy compound is insoluble or hardly soluble in benzene, having the aluminum component soluble in benzene at 60° C. is 10% or less as atomic aluminum, preferably 5% or less, more preferably 2% or less.

Solubility of the organoaluminumoxy compound in benzene is determined by the following procedure. The organoaluminumoxy compound in a quantity corresponding to 100 mg of atomic aluminum is suspended in 100 ml of benzene, stirred at 60° C. for 6 hours for mixing, and filtered under heating at 60° C. by a jacketed filter of G-5 glass. The separated cake on the filter is washed with 50 ml of benzene kept at 60° C. 4 times, and quantity (x mmol) of the atomic aluminum present in the totaled filtrate is measured (x %)

Ionized Ionic Compound (c)

The examples of the ionized ionic compounds (c) (sometimes referred to as ionic ionized or ionic compounds) useful for the present invention include Lewis acids, ionic compounds, borane compounds and carborane compounds.

The Lewis acids useful for the present invention include Mg-, Al- and B-containing ones, of which B-containing ones are more preferable. The B-containing Lewis acids include those represented by the general formula $BR_3$ (R is a phenyl group which may be substituted with fluorine, methyl or trifluoromethyl, or fluorine). More concretely, they include trifluoroboron, triphenylboron, tris(4-fluorophenyl) boron, tris(3,5-difluorophenyl) boron, tris(4-fluoromethylphenyl) boron, tris(pentafluorophenyl) boron, tris(p-tolyl) boron, tris (o-tolyl) boron, and tris(3,5-dimethylphenyl) boron.

The ionic compound is a salt of cationic and anionic compounds, the anion reacting with the above-described metallocene compound (c) to cationize it and to form the ion pair, thereby working to stabilize the transition metal cationic species. The examples of the anion include organoboron, organoarsenic and organoaluminum compound anions. They are preferably relatively bulky and work to stabilize the transition metal cationic species. The examples of the cation include metallic, organometallic, carbonium (carbenium) oxonium, sulfonium, phosphonium and ammonium cation. In more detail, they include triphenylcarbenium, tributylammonium, N,N-dimethylammonium and ferrocenium cation.

The concrete examples of these ionic compounds include trialkyl-substituted ammonium salts, such as N,N-dialkylanilinium, dialkylammonium and triarylphosphonium salt;

trialkyl-substituted ammonium salts, such as triethylammoniumtetra(phenyl) boron, tripropylammoniumtetra(phenyl) boron, tri(n-butyl) ammoniumtetra(phenyl) boron;

dialkyl ammonium salts, such as di(1-propyl) ammoniumtetra(pentafluorophenyl) boron and dicyclohexylammoniumtetra(ohenyl) boron; and other boron-containing ionic compounds, e.g., triphenylcarbeniumtetrakis(pentafluorophenyl) borate, N,N-dimethylaniliniumtetrakis(pentafluorophenyl) borate and ferroceniumtetra(pentafluorophenyl) borate;

borane compounds such as decaborane (14), bis[tri(n-butyl)ammonium]nonaborate, metallic borane anion salts, e.g., nickel acid salts (III) of bis[tri(n-butyl)ammonium]bis (dodecahydridedodecaborate)decaborate; carborane compounds such as 4-carbanonaborane (14), 1,3-dicarbanonaborane (13), metallic carborane anion salts, e.g., nickel acid salts (IV) of bis[tri(n-butyl)ammonium]bis (undecahydride-7-carbaundecaborate)decaborate.

The above ionized ionic compounds (c) may be used either individually or in combination. The organoaluminumoxy compound (b) and ionized ionic compound (c) may be used in such a way that the above-described carrier is impregnated therewith.

The organoaluminum compound (d) may be used together with the organoaluminumoxy compound (b) or ionized ionic compound (c) for production of the metallocene-based catalyst.

Organoaluminum Compound (d)

The organoaluminum compounds (d) which may be used as required for production of the metallocene-based catalyst include the organoaluminum compounds represented by the following general formula (15):

$$R^1{}_n AlX_{3-n} \quad (15)$$

wherein, $R^1$ is a hydrocarbon group of 1 to 12 carbon atoms; X is a halogen or hydrogen; and "n" is 1 to 3. In the general formula (15), $R^1$ is a hydrocarbon group of 1 to 12 carbon atoms, e.g., an alkyl, cycloalkyl or aryl group, more concretely, methyl, ethyl, n-propyl, isopropyl, isobutyl, pentyl, hexyl, octyl, cyclopentyl, cyclohexyl, phenyl or tolyl.

The concrete examples of these organoaluminum compounds (d) include the following compounds:

trialkylaluminum, such as trimethyl aluminum, triethyl aluminum, triisopropy aluminum, triisobutyl aluminum, trioctyl aluminum, and tri-2-ethylhexyl aluminum;

alkenyl aluminum, such as isoprenyl aluminum;

dialkyl alminum halide, such as dimethyl aluminum chloride, diethyl aluminum chloride, diisopropyl aluminum chloride, diisobutyl aluminum chloride, and dimethyl aluminum bromide;

alkyl aluminum sesquihalide, e.g., methyl aluminum sesquichloride, ethyl aluminum sesquichloride, isopropyl aluminum sesquichloride, butyl aluminum sesquichloride, and ethyl aluminum sesquibromide;

alkyl aluminum dihalide, e.g., methyl aluminum dichloride, ethyl aluminum dichloride, isopropyl aluminum dichloride, and ethyl aluminum dibromide; and alkyl aluminum hydride, e.g., diethyl aluminum hydride and diisobutyl aluminum hydride.

The organoaluminum compound represented by the following general formula (15) can be used as the organoaluminum compounds (d) for production of the metallocene-based catalyst:

$$R^1{}_n AlX_{3-n} \quad (16)$$

wherein, $R^1$ is the same as the one for the general formula (15); Y is an $-OR^2$, $-OSiR^3{}_3$, $-OAlR^4{}_2$, $-NR^5{}_2$, $-SiR^6{}_3$ or $-N(R^7)AlR^8{}_2$ group; "n" is 1 to 2; $R^2$, $R^3$, $R^4$ and $R^8$ are each methyl, ethyl, isopropyl, isobutyl, cyclohexyl, or phenyl; $R^5$ is hydrogen, methyl, ethyl, isopropyl, phenyl, trimethylsilyl or the like; and $R^6$ and $R^7$ are each methyl or ethyl.

The concrete examples of the organoaluminum compounds include:

(1) compounds represented by the general formula $R^1{}_n Al(OR^2)_{3-n}$, e.g., dimethyl aluminum methoxide, diethyl aluminum methoxide and diisobutyl aluminum methoxide;

(2) compounds represented by the general formula $R^1{}_n Al(OSiR^2{}_3)_{3-n}$, e.g., $Et_2Al(OSiMe_3)$, $(iso-Bu)_2Al(OSiMe_3)$ and $(iso-Bu)_2Al(OSiEt_3)$;

(3) compounds represented by the general formula $R^1{}_n Al(OAlR^4{}_2)_{3-n}$, e.g., $Et_2AlOAlEt_3$ and $(iso-Bu)_2AlOAl(iso-Bu)_2$;

(4) compounds represented by the general formula $R^1{}_n Al(NR^5{}_2)_{3-n}$, e.g., $Me_2AlNEt_2$, $Et_2AlNHMe$, $Me_2AlNHEt$, $Et_2AlN(SiMe_3)_2$ and $(iso-Bu)_2AlN(SiMe_3)_2$;

(5) compounds represented by the general formula $R^1{}_n Al(SiR^6{}_2)_{3-n}$, e.g., $(iso-Bu)_2AlSiMe_3$; and (6) compounds represented by the general formula $R^1{}_n Al(N(R^7)AlR^8{}_2)_{3-n}$, e.g., $Et_2AlN(Me)AlEt_2$ and $(iso-Bu)_2AlN(Et)Al(iso-Bu)_2$.

Of the compounds represented by the general formula (15) or (16), the more preferable ones are those represented by the general formula $R^1{}_3Al$, $R^1{}_n Al(OR^2)_{3-n}$ or $R^1{}_n Al(OAlR^4{}_2)_{3-n}$, still more preferably those with R of isoalkyl and n=2.

Ethylene and an α-olefin of 4 to 20 carbon atoms are copolymerized normally in the liquid phase in the presence of a catalyst composed of the above-described metallocene catalyst composed of the metallocene compound (a), an organoaluminumoxy compound (b) and/or ionized ionic compound (c), and, optionally organoaluminum compound (d). A hydrocarbon solvent is normally used for the above copolymerization process, but the α-olefin per se may be used as the solvent.

The copolymerization process is effected either batchwise, semicontinuously or continuously. For the batch process, the components of the catalyst are controlled at the following contents.

When the metallocene catalyst composed of the metallocene compound (a), an organoaluminumoxy compound (b) and/or ionized ionic compound (c) is used, content of the of the metallocene compound (a) is normally set at 0.00005 to 0.1 mmol/l (polymerization volume) in the polymerization system, preferably 0.0001 to 0.05 mmol/l. The organoaluminumoxy compound (b) is supplied at 1 to 10000 as the atomic ratio of the aluminum to the transition metal in the metallocene compound (a) in the polymerization system (Al/transition metal atomic ratio), preferably 10 to 5000.

The ionized ionic compound (c) is supplied at 0.5 to 20 as the molar ratio of the ionized ionic compound (c) to the metallocene compound (a) in the polymerization system (ionized ionic compound (c)/metallocene compound (a) molar ratio), preferably 1 to 10.

The organoaluminum compound (d), when used, is supplied to control its content at around 0 to 5 mmol/l (polymerization volume), preferably around 0 to 2 mmol/l.

The copolymerization process is effected normally at −20 to 150° C., preferably 0 to 120° C., more preferably 0 to 100° C., and higher than the atmospheric pressure but 7.8 MPa (80 kgf/cm²G) or lower, preferably higher than the atmospheric pressure but 4.9 MPa (50 kgf/cm²G) or lower.

Ethylene and α-olefin are supplied to the polymerization system at rates to obtain the ethylene/α-olefin copolymer [A] of the above-mentioned specified composition. A molecular weight adjusting agent, such as hydrogen, may be used for the copolymerization process.

Copolymerization of ethylene and α-olefin under the above conditions normally gives a polymerization effluent containing an ethylene-based copolymer. It is treated by the normal procedure to produce the ethylene-based copolymer of the present invention.

The ethylene-based copolymer of the present invention is used as a resin modifier, incorporated in the ethylene/α-olefin copolymer, propylene-based polymer or the like.

Ethylene-based Copolymer [B]

The ethylene-based copolymer [B] used for the present invention comprises ethylene and at least one compound selected from the group consisting of α-olefin and cycloolefin-based compound of 3 to 20 carbon atoms.

The concrete examples of the α-olefins useful for the present invention include propene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene-1-octene, 3-ethyl-1-hexene, 1-octene, 1-decene, 1-dodecene, 1-tetradecene, 1-hexadecene, 1-octadecene, and 1-eicosene, of which propene, 1-butene, 1-hexene, 4-methyl-1-pentene and 1-octene are more preferable.

The cyclo-olefins useful for the present invention include those represented by the general formula (1-1) or (1-2).

A polyene may be used, in addition to ethylene, an α-olefin and/or cyclo-olefin-based compound of 3 to 20, within limits not harmful to the object of the present invention.

The examples of the polyenes useful for the present invention include cyclic polyenes, such as 5-ethylidene-2-norbornene, 5-vinyl-2-norbornene, 5-isopropenyl-2-norbornene, dicyclopentadiene, and non-conjugated triene and tetraene, of which 5-ethylidene-2-norbornene and dicyclopentadiene are preferable. These cyclic polyene-based compounds may be used either individually or in combination.

The ethylene-based copolymer [B] used for the present invention preferably comprises 80 to 93% by mole of an ethylene-derived recurring unit and 1 to 20% by mole of at least one compound selected from the group consisting of α-olefin or cyclo-olefin-based compound of 3 to 20 carbon atoms.

(B-i) Density

The ethylene-based copolymer [B] used for the present invention has a density of 0.870 to 0.895 g/cm$^3$, preferably 0.870 to 0.890 g/cm$^3$, more preferably 0.875 to 0.890 g/cm$^3$. When incorporated in a resin, e.g., polypropylene, as a resin modifier, the ethylene-based copolymer [B] having a density in the above range will give the composition well-balanced in rigidity and impact resistance. The modifier having a density beyond the above range may give the composition of deteriorated impact strength and excessive hardness.

The ethylene-based copolymer [B] used for the present invention preferably satisfies the following properties (B-ii) and (B-iii):

(B-ii) Melt Flow Rate

The ethylene-based copolymer [B] used for the present invention has a melt flow rate (190° C. and a load of 2.16 kg) of 0.1 to 50 g/10 minutes, preferably 0.3 to 30 g/10 minutes.

(B-iii) Relationship between $T_m$ and Density (d)

The ethylene-based copolymer [B] used for the present invention satisfies the following relationship between $T_m$ and density (d), wherein $T_m$ is temperature at the maximum peak in the endothermic curve, measured by a differential scanning calorimeter (DSC):

$T_m < 400 \times d - 250$, preferably $T_m < 400 \times d - 297$, more preferably $T_m < 500 \times d - 344$, and still more preferably $T_m < 500 \times d - 391$.

Moreover, the ethylene-based copolymer [B] used for the present invention preferably satisfies, in addition to the above properties, the following relationship between melt tension (MT) at room temperature and melt flow rate (MFR, 190° C. and a load of 2.16 kg):

$MT \leq 2.20 \times MFR^{-0.84}$

Moreover, the ethylene-based copolymer [B] used for the present invention preferably satisfies the following relationship between fraction of the n-decane-soluble component at room temperature (W, % by weight) and density (d):

(a) at an MFR of 10 g/10 minutes or less:

$W < 80 \times \exp(-100(d-0.88)) + 0.1$, more preferably $W < 60 \times \exp(-100(d-0.88)) + 0.1$, still more preferably $W < 40 \times \exp(-100(d-0.88)) + 0.1$.

More preferably, it also satisfies the following relationship:

(b) at an MFR higher than 10 g/10 minutes:

$W < 80 \times (MFR-9)^{0.26} \times \exp(-100(d-0.88)) + 0.1$.

The ethylene-based copolymer [B] can be produced by copolymerization of ethylene and at least one compound selected from the group consisting of α-olefin and cyclo-olefin-based compound of 3 to 20 carbon atoms in the presence of the metallocene catalyst. The metallocene catalysts useful for the present invention include:
bis(cyclopentadienyl) zirconium dichloride,
bis(methylcyclopentadienyl) zirconium dichloride,
bis(ethylcyclopentadienyl) zirconium dichloride,
bis(n-propylcyclopentadienyl) zirconium dichloride,
bis(n-butylcyclopentadienyl) zirconium dichloride,
bis(n-hexylcyclopentadienyl) zirconium dichloride,
bis(methyl-n-propylcyclopentadienyl) zirconium dichloride,
bis(methyl-n-butylcyclopentadienyl) zirconium dichloride,
bis(dimethyl-n-butylcyclopentadienyl) zirconium dichloride,
bis(n-butylcyclopentadienyl) zirconium dibromide,
bis(n-butylcyclopentadienyl) zirconium methoxy chloride,
bis(n-butylcyclopentadienyl) zirconium ethoxy chloride,
bis(n-butylcyclopentadienyl) zirconium butoxy chloride,
bis(n-butylcyclopentadienyl) zirconium ethoxide,
bis(n-butylcyclopentadienyl) zirconium methyl chloride,
bis(n-butylcyclopentadienyl) zirconium dimethyl,
bis(n-butylcyclopentadienyl) zirconium benzyl chloride,
bis(n-butylcyclopentadienyl) zirconium dibenzyl,
bis(n-butylcyclopentadienyl) zirconium phenyl chloride, and
bis(n-butylcyclopentadienyl) zirconium hydride chloride.

Each of these compounds may be substituted at two positions, or 1,2- and 1,3-positions. The above metallocene compound (a) may have zirconium substituted by titanium or hafnium.

Ethylene/α-olefin Copolymer Composition

For the ethylene/α-olefin copolymer composition [A] for the present invention, it is preferable that ratio of density ($d_b$) of the ethylene-based copolymer [B] to density ($d_a$) of the composition [A] ($d_b/d_a$) be 1.05 or less, preferably 1.04 or less. Its lower limit is preferably 1.01, more preferably 1.02.

The ethylene/α-olefin copolymer composition [A] having the ($d_b/d_a$) ratio in the above range has excellent transparency and breaking elongation, and exhibits excellent properties as a modifier.

The ethylene/α-olefin copolymer composition of the present invention is useful as a modifier for thermoplastic resins to improve their impact resistance and rigidity. These thermoplastic resins include polyolefin, polyamide, polyester, polystyrene, polyvinyl chloride and polyvinyl alcohol. When used for modification of a thermoplastic resin containing a polar group, the ethylene/α-olefin copolymer composition of the present invention may be graft-modified with an unsaturated carboxylic acid.

The ethylene/α-olefin copolymer composition of the present invention, comprising a specific ethylene/α-olefin copolymer and specific ethylene-based copolymer, can improve balances between rigidity and breaking point strength/impact resistance of the thermoplastic resin for which it is used as a modifier, these effects being especially noted when it is used for polypropylene. It also shows good workability, facilitating the modification process without causing blocking or other troubles.

When used as a modifier for a resin, e.g., polypropylene, the ethylene/α-olefin copolymer composition of the present invention is preferably handled by an extruder or the like which continuously kneads and discharges the resin composition. It is preferable to effect the kneading process at softening temperature or melting point of the resin being discharged or higher but 400° C. or lower.

It is recommended, when the ethylene/α-olefin copolymer composition of the present invention is used as a modifier for a resin, e.g., polypropylene, that it be pelletized by extrusion or injection molding and blended in the molten resin to be modified.

The ethylene/α-olefin copolymer composition of the present invention, when used as a modifier for a resin, e.g., polypropylene, can improve properties of the resin, in particular impact resistance at low temperature and tensile elongation strength, while keeping its inherent rigidity.

The method of the present invention for resin modification is characterized by blending the pellets of the ethylene/α-olefin copolymer composition and the resin to be modified in molten state. This method can modify a thermoplastic resin to have well-balanced rigidity and breaking point strength/impact resistance without causing blocking or other troubles. As such, it is an excellent thermoplastic resin modification method in productivity and workability.

[Propylene-based Polymer Composition]

The propylene-based polymer composition of the present invention comprises a propylene-based polymer, and the ethylene/α-olefin copolymer [A] and ethylene-based copolymer [B], namely the propylene-based polymer and ethylene/α-olefin copolymer composition [AB].

First Propylene-based Polymer Composition (1)

The first propylene-based polymer composition (1) of the present invention is comprised of the propylene-based polymer [C-1], ethylene/α-olefin copolymer [A] and ethylene-based copolymer [B], namely the propylene polymer [C-1] and ethylene/α-olefin copolymer composition [AB].

It contains the propylene-based polymer [C-1] at 99 to 1% by weight, preferably 98 to 60%, more preferably 95 to 65%, and ethylene/α-olefin copolymer [A] and ethylene-based copolymer [B] at 1 to 99% by weight (total content of [A] and [B]), preferably 2 to 40%, more preferably 5 to 35%.

The content ratio of the ethylene/α-olefin copolymer [A] to the ethylene-based copolymer [B], ([A]/[B] content ratio), is 1/99 to 70/30, 3/97 to 70/30 as the ratio of one of the preferred embodiments, still more preferably 3/97 to 29/71, as is the case with the above-described ethylene/α-olefin copolymer.

It is preferable that the propylene-based copolymer have a damping factor (tan δ) peak caused from the glass transition temperature of the propylene-based polymer [C-1] and another damping factor (tan δ) peak caused from the glass transition temperature of the ethylene/α-olefin copolymer composition (composed of the ethylene/α-olefin copolymer [A] and ethylene-based copolymer [B]), when the temperature-dependence of the modulus of elasticity is measured at intervals of 3° C., and that these peaks be separated from each other. It is judged that these peaks are "separated," when the two peaks are distinctly observed, or there is a saddle between the tops of these peaks. The propylene-based polymer composition is excellent both in impact resistance and rigidity, when it has two "separated" peaks.

The propylene-based polymer composition may be insufficient both in impact resistance and rigidity, when it has these peaks that are not distinctly "separated" but are "fused" with each other.

The propylene-based polymer [C-1] preferably has an MFR (190° C. and a load of 2.16 kg) of 0.1 g/10 minutes or more, more preferably 0.5 to 200 g/10 minutes, still more preferably 1 to 200 g/10 minutes.

Use of propylene-based polymer [C-1] can give well-balanced rigidity, tensile breaking point elongation and/or impact-resistant characteristics, and also excellent in fluidity to a propylene-based polymer composition.

The propylene-based polymer [C-1] is a propylene homopolymer, or a copolymer of propylene and ethylene or an α-olefin of 4 to 20 carbon atoms. The α-olefins of 4 to 20 carbon atoms include ethylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. These α-olefins may be used either individually or in combination. Each α-olefin may form a random or block copolymer with propylene.

The preferable polymers for the present invention are propylene homopolymer, crystalline propylene/ethylene block copolymer containing ethylene at 2 to 40% by mole and crystalline propylene/ethylene random copolymer containing ethylene at 0.5 to 10% by mole are preferable.

By blending the propylene-based polymer [C-1] having an MFR of 4 g/10 minutes or more, the ethylene/α-olefin copolymer composition can be improved properties, especially breaking point strength and impact resistance, while keeping the inherent rigidity of the polymer itself.

The propylene-based polymer [C-1] preferably has a density normally of 0.885 to 0.910 g/cm$^3$, more preferably 0.890 to 0.910 g/cm$^3$, still more preferably 0.895 to 0.910 g/cm$^3$.

Moreover, the propylene-based polymer [C-1] has a refractive index normally of 1.490 to 1.510, preferably 1.495 to 1.510, more preferably 1.500 to 1.510.

The propylene-based polymer [C-1] having these properties can be produced by various processes, for example, in the presence of a catalyst composed of solid titanium and an organometallic compound as the catalyst components, high-activity titanium catalyst composed of an electron donor in addition to the above two components, catalyst composed of a metallocene compound and aluminoxane, or a combination thereof. In case that the propylene-based polymer [C-1] is a block copolymer, different catalysts may be used for different steps in the multi-stage polymerization process.

The method for producing the olefin-based polymer composition (1) of the present invention is not limited. For example, the ethylene/α-olefin copolymer [A], ethylene-based copolymer [B] and propylene-based polymer [C-1] may be kneaded altogether, or the propylene-based polymer [C-1] and the ethylene/α-olefin copolymer composition may be kneaded by a known method using an internal mixer, e.g., Banbury mixer, kneader or intermix. The latter method is more preferable for the present invention because of its workability.

A styrene-based thermoplastic elastomer may be added for production of the propylene-based polymer composition (1) within limits not harmful to the object of the present invention. The styrene-based thermoplastic elastomers useful for the present invention include a block copolymer of a styrene compound and conjugated diene. The styrenes useful for the present invention include alkyl styrenes, e.g., styrene, α-methyl styrene and p-methyl styrene, p-methoxy styrene, vinyl naphthalene, and a combination thereof. Of these, styrene is more preferable.

The conjugated diene compounds useful for the present invention include butadiene, isoprene, piperylene, methylpentadiene, phenylbutadiene, 3,4-dimethyl-1,3-hexadiene, 4,5-diethyl-1,3-octadiene, and a combination thereof, of which butadiene and isoprene are more preferable.

The concrete examples of these styrene-based thermoplastic elastomers include styrene/butadiene diblock copolymer, styrene/butadiene/styrene triblock copolymer, styrene/isoprene diblock copolymer, styrene/isoprene/styrene triblock copolymer, hydrogenated styrene/butadiene diblock copolymer, hydrogenated styrene/butadiene/styrene triblock copolymer, hydrogenated styrene/isoprene diblock copolymer, and hydrogenated styrene/isoprene/styrene triblock copolymer.

The styrene-based thermoplastic elastomer for the present invention preferably comprises the recurring unit derived from the styrene-based compound and that derived from the conjugated diene compound in a weight ratio of 10/90 to 65/35, preferably 20/80 to 50/50.

The molecular structure of the styrene-based thermoplastic elastomer may be of straight-chain, branched, radiating, or a combination thereof. The propylene-based polymer composition of the present invention may comprise, in addition to the above-described ethylene/α-olefin copolymer composition and propylene-based polymer [C-1], one or more additives, e.g., nucleating agent, antioxidant, hydrochloric acid absorber, softening agent, light stabilizer, ultraviolet absorber, lubricant, antiaging agent, processing aid, heat stabilizer, weathering stabilizer, antistatic agent, flame retardant, pigment, dye, dispersant, copper inhibitor, neutralizer, foaming agent, plasticizer, antifoaming agent, crosslinking agent, flow improver (e.g., peroxide), weld strength improver, and antifogging agent. Moreover, it may be further blended with a known inorganic filler, e.g., talc or glass fibers, preferably at 1 to 40 parts by weight per 100 parts by weight of the propylene-based polymer composition.

The propylene-based polymer composition (1) of the present invention can be formed into various shapes, e.g., film, sheet and pipe, by a forming method, e.g., extrusion, injection molding, inflation or calendering. The formed article is excellent in recovery from the strained conditions.

The propylene-based polymer composition of the present invention, comprising a specific ethylene/α-olefin copolymer and specific ethylene-based copolymer, has well-balanced resin rigidity and breaking point strength/impact resistance.

Second Propylene-based Polymer Composition (2)

The second propylene-based polymer composition (2) of the present invention is composed of the propylene-based polymer [C-2], ethylene/α-olefin copolymer [A], ethylene-based copolymer [B] and an inorganic filler [D]. In other words, it comprises the propylene-based polymer, ethylene/α-olefin copolymer composition and an inorganic filler, and hence falls into the category of the propylene-based polymer composition (1).

In particular, the ethylene/α-olefin copolymer [A] for the second propylene-based polymer composition (2) of the present invention has the following characteristics, and is specifically referred to as [A-1]:

[A-1] Copolymer of ethylene and α-olefin of 4 to 20 carbon atoms (ethylene/α-olefin copolymer) comprises (i) 50 to 70% by mole of (a) a recurring unit derived from the ethylene and 30 to 50% by mole of (b) a recurring unit derived from the α-olefin of 4 to 20 carbon atoms, and (ii) has an intrinsic viscosity [η] of 0.1 to 10.0 dl/g, determined in decalin at 135° C.

The ethylene-based copolymer [B] for the second propylene-based polymer composition (2) of the present invention has the following characteristics, and is specifically referred to as [B-1]:

[B-1]: Copolymer of (a) ethylene and (b) at least one compound selected from the group consisting of an α-olefin and cyclo-olefin of 3 to 20 carbon atoms, has (i) a density of 0.870 to 0.895 g/cm$^3$ and (ii) a melt flow rate (190° C. and a load of 2.16 kg) of 0.1 to 50 g/10 minutes.

The ethylene/α-olefin-based copolymer composition [AB] is composed of the ethylene/α-olefin-based copolymer [A] at 1 to 50% by weight, preferably 3 to 40%, more preferably 3 to 30%, still more preferably 3 to 29%, and the copolymer [B] at 50 to 99% by weight, preferably 60 to 97%, more preferably 70 to 97%, still more preferably 71 to 97%, based on the whole composition of [A] and [B].

Combination of the ethylene/α-olefin-based copolymer composition [AB] and inorganic filler [D] brings about the favorable effects of improving rigidity and tensile breaking point elongation while keeping balances between them.

It is adequate that the propylene-based polymer composition of the present invention be composed of the propylene-based polymer [C-2] at 20 to 93% by weight, preferably 30 to 90%, more preferably 40 to 80%; ethylene/α-olefin copolymer composition [AB] at 6 to 79%, preferably 10 to 70%, more preferably 20 to 60%; and inorganic filler [D] at 1 to 25%, preferably 5 to 20%, wherein the sum of the propylene-based polymer [C-2], ethylene/α-olefin copolymer composition [AB] and inorganic filler [D] is 100% by weight.

The propylene-based polymer composition of the present invention has sufficiently improved properties, in particular impact resistance at low temperature and tensile elongation strength, when it contains the ethylene/α-olefin copolymer composition [AB] at higher than the above-described lower limit, and is less likely to lose the excellent original properties of the propylene-based polymer [C-2], when it contains [AB] at lower than the above-described upper limit. The propylene-based polymer composition has sufficiently improved properties, in particular rigidity and heat resistance, when it contains the inorganic filler [D] at higher than the above-described lower limit, and is less likely to lose the characteristics, e.g., moldability and outer appearances, when it contains [D] at lower than the above-described upper limit.

The ethylene-based copolymer [A-1] preferably used for the present invention (A-i) comprises (a) a recurring unit derived from ethylene in the ethylene-based copolymer [A] at 50 to 70% by mole, preferably 50 to 68%, and (b) a recurring unit derived from an α-olefin of 4 to 20 carbon atoms at 30 to 50% by mole, preferably 32 to 50%. The composition has excellent blocking characteristics with each recurring unit present in the above range.

Moreover, the ethylene-based copolymer [A-1] used for the present invention preferably satisfies the above-described characteristics (A-ii), (A-iii), (A-v) and (A-vi).

The ethylene-based copolymer [B-1] used for the present invention has (B-i) a density of 0.870 to 0.895 g/cm$^3$, preferably 0.870 to 0.890 g/cm$^3$, more preferably 0.875 to 0.890 g/cm$^3$. When incorporated in a resin, e.g., polypropylene, as a resin modifier, the ethylene-based copolymer [B-1] having a density in the above range will give the composition well-balanced in rigidity and impact resistance.

The ethylene-based copolymer [B-1] used for the present invention has a melt flow rate (at 190° C. and a load of 2.16 kg) of 0.1 to 50 g/10 minutes, preferably 0.3 to 30 g/10 minutes.

Moreover, the ethylene-based copolymer [B-1] used for the present invention preferably satisfies the above-described property (B-iii).

In the present invention, the specific propylene-based polymer [C-2] having the following characteristics is used. The propylene-based polymer [C-2] may be a homopolypropylene, or propylene-based block or random copolymer so long as it satisfies the following characteristics, but is preferably homopolypropylene or propylene-based block copolymer.

The propylene-based block copolymer is preferably composed of the highly crystalline polypropylene component (crystalline component) and ethylene/propylene copolymer rubber component soluble in n-decane at room temperature (23° C.) (rubber component).

The propylene-based copolymer [C-2] has a melt flow rate (determined in accordance with ASTM D1238 at 230° C. and a load of 2.16 kg) of 0.1 to 400 g/10 minutes, preferably 0.1 to 200 g/10 minutes. The propylene-based copolymer [C-2] having a melt flow rate in the above range can give the propylene-based copolymer composition which is excellent in fluidity and can be formed into a large-sized shape.

Moreover, the propylene-based copolymer [C-2] used for the present invention contains the component soluble in n-decane at room temperature (23° C.) (rubber component) at 0.01 to 30% by weight, preferably 0.1 to 30%, more preferably 0.1 to 20%. The component can sufficiently exhibit the effect of improving impact resistance when contained at 0.01% by weight or more, and the effect of improving rigidity when contained at 30% by weight or less.

The component soluble in n-decane at room temperature has an intrinsic viscosity [η] of 0.2 to 10 dl/g, determined in decalin at 135° C., preferably 0.2 to 8 dl/g.

Moreover, the component soluble in n-decane at room temperature preferably contains the ethylene-derived recurring unit at 30 to 50% by mole, preferably 30 to 45% by mole.

The component soluble in n-decane at room temperature is the rubber component for the propylene-based copolymer [C-2], and is preferably an isotactic polypropylene or ethylene/propylene copolymer.

The component soluble in n-decane at room temperature for the propylene-based copolymer [C-2] may be contained a unit derived from a polymerizable compound other than ethylene or propylene, within the limits not harmful to the object of the present invention.

These polymerizable compounds useful for the present invention, other than ethylene or propylene, include α-olefins, such as 1-butene, 1-pentene, 1-hexene, 1-heptane, 1-octene, 1-decene, 1-dodecene, 1-hexadecene, 4-methyl-1-pentene; vinyl compounds, such as vinyl cyclopentane, vinyl cyclohexane and vinyl norbornane; vinyl ester, such as vinyl acetate; and unsaturated organic acids, such as maleic anhydride or its derivative.

Content of the component soluble in n-decane at room temperature for the propylene-based copolymer [C-2] can be determined by the following procedure:

5 g of the sample (propylene polymer) is immersed in 200 ml of boiling decane for 5 hours to be dissolved therein and cooled to room temperature, and the separated solid phase is filtered by a G4 glass filter and dried, to determine the content from the solid phase weight by the back calculation.

The propylene-based copolymer [C-2] contains the component insoluble in n-decane at room temperature at 99.99 to 70% by weight, preferably 99.9 to 70%, more preferably 99.9 to 80%.

The component insoluble in n-decane at room temperature is the highly crystalline polypropylene component (isotactic polypropylene) in the propylene-based polymer. More concretely, it has a pentad isotacticity $I_5$ of 0.95 or more, determined by the $^{13}$C-NMR spectroscopy, preferably 0.97 or more.

Pentad isotacticity $I_5$ is an isotactic fraction of the polypropylene molecular chain, determined by the $^{13}$C-NMR (nuclear magnetic resonance) spectroscopy proposed by A. Zambelli et al, Macromolecules 6, 925 (1973). It is a fraction of the propylene monomer unit expressed in the pentad unit, in which a series of 5 propylene monomer units are bound to each other in an isotactic manner.

The compounds to which the NMR peaks are relevant are determined by the method described in Macromolecules 8, 687 (1975). The $^{13}$C-NMR spectroscopy is measured by a Fourier transformed NMR analyzer (500 MHz for measurement of the hydrogen nuclear), and the signal detection limit of the $^{13}$C-NMR spectroscopy can be improved to 0.001 by integrating 20,000 measurements at 125 MHz.

The propylene polymer with the component insoluble in n-decane at room temperature having an $I_5$ level in the above range can give the composition excellent in rigidity.

In propylene-based polymer [C-2], the polymer which contains homopolymers or copolymers of 3-methyl-1-butene, 3,3-dimethyl-1-butene, 3-methyl-1-pentene, 3-methyl-1-hexene, 3,5,5-trimethyl-1-hexene, vinyl cyclopentene, and vinyl norbornene as a prepolymer prepolymerized, has high crystallized rate.

The propylene-based polymer [C-2] for the present invention can be produced by various processes, e.g., in the presence of a catalyst of high stereoregularity.

More concretely, it can be produced in the presence of a catalyst composed of solid titanium, an organometallic compound and, optionally, electron donor as the catalyst components.

The concrete examples of the solid titanium catalyst component useful for the present invention include the solid titanium catalyst in which titanium trichloride or its composition is supported by a carrier having a specific surface area of 100 m$^2$/g or more, and the solid titanium catalyst in which magnesium, a halogen, electron donor (preferably aromatic carboxylate ester or alkyl-containing ether) and titanium as the essential components are supported by a carrier having a specific surface area of 100 m$^2$/g or more. Of these, the latter being more preferable.

The organometallic compounds useful for the present invention as the catalyst component include organoaluminum compounds, e.g., trialkyl aluminum, dialkyl aluminum hydride, alkyl aluminum sesqui-halide, and alkyl aluminum dihalide. An adequate organoaluminum compound may be selected, depending on type of the titanium component used.

The electron donors useful for the present invention include organic compounds containing nitrogen, phosphorus, silicon or boron, preferably the esters or ethers containing one of the above elements.

These catalysts may be activated by an adequate method, such as co-grinding and the above olefin may be prepolymerized onto the catalysts.

The concrete examples of the inorganic filler [D] useful for the present invention include:

powdered fillers, including finely powdered natural silicic acids and silicates, e.g., talc, kaolinite, fired clay, pyrophyllite, sericite and wollastonite; carbonates, e.g., precipitating calcium carbonate, limestone powder and magnesium carbonate; hydroxides, e.g., aluminum hydroxide and magnesium hydroxide; oxides, e.g., zinc oxide, zinc white and magnesium oxide; and synthetic silicic acids and silicates, e.g., hydrated calcium silicate, hydrated aluminum silicate, hydrated silicic acid and anhydrous silicic acid;

flaky fillers, e.g., mica;

fibrous fillers, e.g., basic magnesium sulfate whisker, calcium titanate whisker, aluminum borate whisker, sepiolite, processed mineral fiber (PMF), xonotlite, potassium titanate and ellestadite; and balloon fillers, e.g., glass balloons and fry ash balloons.

Of these, talc is more preferable for the present invention, especially finely powdered talc having an average particle size of 0.01 to 10 µm.

The average particle size may be determined by the liquid sedimentation method.

The inorganic filler for the present invention, in particular talc, may be untreated or surface-treated beforehand. When surface treated, it may be treated chemically with a silane coupling agent, higher fatty acid, polyethylene glycol or the like, or physically. The blend of the surface-treated inorganic filler to the composition gives high weld strength, coating characteristics and moldability to automobile interiors and exteriors and gasoline tanks.

The above inorganic fillers may be used either individually or in combination.

The composition of the present invention may be incorporated with, in addition to the inorganic filler, an organic filler, e.g., high styrenes, lignin or recycled rubber.

Combination of the specific ethylene/α-olefin-based copolymer composition [AB] and inorganic filler [D] makes the second propylene-based copolymer composition (2) of the present invention suitable as a modifier for propylene, improving its rigidity and tensile breaking point elongation while keeping balances between them. By the blend of the specific ethylene/α-olefin copolymer composition [AB] and inorganic filler [D] to the above-described propylene-based polymer [C-2], the propylene-based polymer composition having the desired characteristics is obtained.

In the modification of the resin, it is preferable to use an extruder or the like which continuously kneads and discharges the resin composition. It is also preferable to effect the kneading process at softening temperature of the resin being discharged or higher but 400° C. or lower.

It is adequate that the propylene-based polymer composition of the present invention is composed of the propylene-based polymer [C-2] at 20 to 93% by weight, preferably 30 to 90%, more preferably 40 to 80%; ethylene/α-olefin copolymer composition [AB] at 6 to 79%, preferably 10 to 70%, more preferably 20 to 60%; and inorganic Filler [D] at 1 to 25%, preferably 5 to 20%, wherein the sum of the propylene-based polymer [C-2], ethylene/α-olefin copolymer composition [AB] and inorganic filler [D] is 100% by weight.

The propylene-based polymer composition of the present invention has sufficiently improved properties, in particular impact resistance at low temperature and tensile elongation strength, when it contains the ethylene/α-olefin copolymer composition [AB] as the modifier at higher than the above-described lower limit, and is less likely to lose the excellent properties the propylene-based polymer [C-2] inherently have, when it contains [AB] at lower than the above-described upper limit.

The propylene-based polymer composition has sufficiently improved properties, in particular rigidity and heat resistance, when it contains the inorganic filler [D] at higher than the above-described lower limit, and is less likely to lose the characteristics, e.g., moldability and outer appearances, when it contains [D] at lower than the above-described upper limit.

It is preferable that the obtained propylene-based copolymer composition have a damping factor (tan δ) peak caused from the glass transition temperature of the propylene-based polymer [C-2] and that caused from the glass transition temperature of the ethylene/α-olefin copolymer composition, when the temperature-dependence of the modulus of elasticity is measured at intervals of 3° C., and that these peaks be separated from each other. It is judged that these peaks be "separated," when the two peaks are distinctly observed, or there is a saddle between the tops of these peaks. The propylene-based copolymer which has two "separated" peaks is excellent both in impact resistance and rigidity.

The propylene-based polymer may be insufficient both in impact resistance and rigidity, when these peaks are not distinctly "separated" but are "fused" with each other.

The propylene-based polymer composition of the present invention may be incorporated with one or more additives within limits not harmful to the object of the present invention. The additives useful for the present invention include a nucleating agent, antioxidant, hydrochloric acid absorber, heat stabilizer, light stabilizer, ultraviolet absorber, lubricant, antistatic agent, flame retardant, pigment, dye, dispersant, copper inhibitor, neutralizer, foaming agent, plasticizer, antifoaming agent, crosslinking agent, flow improver (e.g., peroxide), and weld strength improver.

As antioxidants, phenol-based antioxidant, sulfur-based antioxidant and phosphorus-based antioxidant and the like can be used.

More concretely, the phenol-based antioxidants include phenols, e.g., 2,6-di-tert-butyl-p-cresol, stearyl(3,3-dimethyl-4-hydroxybenzyl)thioglycolate, stearyl-β-(4-hydroxy-3,5-di-tert-butylphenol)propionate, distearyl-3,5-di-tert-butyl-4-hydroxybenzylsulfonate, 2,4,6-tris(3',5'-di-tert-butyl-4'-hydroxybenzylthio)-1,3,5-triazine, stearyl(4-hydroxy-3-methyl-5-tert-butylbenzyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis(4-hydroxy-3-tert-butylphenyl) butylic acid]glycol ester, 4,4'-butylidenebis(6-tert-butyl-m-cresol), 1,1,3-tris(2-methyl-4-hydroxy-5-tert-butylphenyl) butane, bis(2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butyl)benzylisocyanurate, 1,3,5-tris(3,5-di-tert-butyl-4-hydroxybenzyl)-2,4,6-trimethylbenzene, tetrakis [methylene-3-(3,5-di-tert-butyl-4-hydroxyphenyl) propionate]methane, 1,3,5-tris(3,5-di-tert-butyl-4-hydroxybenzyl)isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3,5-triazine, and 4,4'-thiobis(6-tert-butyl-m-cresol); and polyvalent phenol/carbonate oligoesters, e.g., that of 4,4'-butylidenebis(2-tert-butyl-5-methylphenol) having a degree of polymerization of, e.g., 2 to 10.

The sulfur-based antioxidants useful for the present invention include dialkyl thiodipropionates, e.g., dilauryl, dimyristyl or distearyl thiodipropionates; and esters of alkyl thiopropionates (e.g., butyl, oxtyl, lauryl or stearyl thiopropionates) and polyhydric alcohols (e.g., glycerin, trimethylol ethane, trimethylol propane, pentaerythritol and trishydroxyethylisocyanurate).

The phosphorus-based antioxidants useful for the present invention include trioctyl phosphite, trilauryl phosphite, tridecyl phosphite, octyl-diphenyl phosphite, tris(2,4-di-tert-butylphenyl) phosphite, triphenyl phosphite, trisbutoxyethyl phosphite, tris(nonylphenyl) phosphite, distearylpentaerythritol diphosphite, tetra(tridecyl)-1,1,3-tris(2-methyl-5-tert-butyl-4-hydroxyphenyl) butane diphosphite, tetraalkyl (a mixed alkyl of 12 to 15 carbon atoms)-4,4'-isopropylidenediphenyl diphosphite, tetra(tridecyl)-4,4'-butylidenebis(3-methyl-6-tert-butylphenol) diphosphite, tris(3,5-di-tert-butyl-4-hydroxyphenyl) phosphite, tris(a mixed mono- and di-nonylphenyl) phosphite, hydrogenated 4,4'-isopropylidenediphenol polyphosphite, bis(octylphenyl).bis[4,4'-butylidenebis(3-methyl-6-tert-butylphenol.1,6-hexanediol diphosphite, phenyl.4,4'-isopropylidenediphenol-pentaerythritol diphosphite, bis(2,4-di-tert-butylphenyl) pentaerythritol diphosphite, bis(2,6-di-tert-butyl-4-methylphenyl) pentaerythritol diphosphite, tris[4,4'-isopropylidenebis(2-tert-butylphenol)] phosphite, phenyl-diisodecyl phosphite, di(nonylphenyl) pentaerythritol diphosphite, tris[1,3-di-stearoyloxyisopropyl] phosphite, 4,4'-isopropylidenebis(2-tert-butylphenol) di(nonylphenyl) diphosphite, 9,10-di-hydro-9-oxa-9-oxa-10-phsphaphenanthrene-10-oxide, and tetrakis(2,4-di-tert-butylphenyl)-4,4'-biphenylene diphosphonite.

The other antioxidants useful for the present invention include 6-hydroxychromane derivatives, e.g., α-, β-, γ- and δ-tocopherols and a mixture thereof, 2,5-dimethyl-substituted 2-(4-methyl-pentan-3-enyl)-6-hydroxychromane, 2,5,8-trimethyl-substituted 2-(4-methyl-pentan-3-enyl)-6-hydroxychromane and 2,5,7,8-tetramethyl-substituted 2-(4-methyl-pentan-3-enyl)-6-hydroxychromane, 2,2,7-trimethyl-5-tert-butyl-6-hydroxychromane, 2,2,5-trimethyl-7-tert-butyl-6-hydroxychromane, 2,2,5-trimethyl-6-tert-butyl-6-hydroxychromane, and 2,2-dimethyl-5-tert-butyl-6-hydroxychromane.

The compounds represented by the general formula

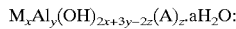

wherein, M is Mg, Ca or Zn; A is an anion other then hydroxyl; "x," "y" and "z" are each a positive number; and "a" is 0 or a positive number,
may be used as the hydrochloric acid absorbers for the present invention. These compounds include $Mg_6Al_2(OH)_{16}CO_3.4H_2O$,
$Mg_6Al_2(OH)_{20}CO_3.5H_2O$,
$Mg_5Al_2(OH)_{14}CO_3.4H_2O$,
$Mg_{10}Al_2(OH)_{22}CO_2.4H_2O$,
$Mg_6Al_2(OH)_{16}HPO_4.4H_2O$,
$Ca_6Al_2(OH)_{16}CO_3.4H_2O$,
$Zn_6Al_2(OH)_{16}CO_3.4H_2O$,
$Zn_6Al_2(OH)_{16}SO_4.4H_2O$,
$Mg_6Al_2(OH)_{16}SO_3.4H_2O$, and
$Mg_6Al_2(OH)_{112}CO_3.3H_2O$.

The light stabilizers useful for the present invention include hydroxybenzophenones, e.g., 2-hydroxy-4-methoxybenzophenone, 2-hydroxy-4-n-octoxybenzophenone-2,2'-di-hydroxy-4-methoxybenzophenone and 2,4-dihydroxybenzophenone; benzotriazoles, e.g., 2-(2'-hydroxy-3'-tert-butyl-5'-methylphenyl)-5-chlorobenzotriazole, 2-(2'-hydroxy-3',5'-butyllphenyl)-5-chlorobenzotriazole, 2-(2'-hydroxy-5'-methylphenyl)-5-chlorobenzotriazole and 2-(2'-hydroxy-3',5'-di-tert-amylphenyl)-5-chlorobenzotriazole;

benzoates, e.g., phenyl salycylate, p-tert-butylphenyl salycylate, 2,4-di-tert-butylphenyl-3,5-di-tert-butyl-4-hydroxybenzoate, and hexadecyl-3,5-di-tert-butyl-4-hydroxybenzoate;

nickel compounds, e.g., Ni salts of 2,2'-thiobis(4-tert-octylphenol), [2,2'-thiobis(4-tert-octylphenolate)-n-butylamine Ni and Ni salt of (3,5-di-tert-butyl-4-hydroxybenzyl) phosphonic acid monoethyl ester; substituted acrylonitriles, e.g., α-cyano-β-methyl-β-(p-methoxyphenyl) methyl acrylate;

oxalic acid dianilides, e.g., N'-2-ethylphenyl-N-ethoxy-5-tert-butylphenyl oxalic acid diamide and N-2-ethylphenyl-N'-2-ethoxyphenyl oxalic acid diamide; and hindered amine compounds, e.g., bis(2,2,6,6-tetramethyl-4-piperidine) sebacate, poly[{6-(1,1,3,3-tetramethylbutyl)imino}hexamethylene], condensate of dimethyl succinate and 2-(4-hydroxy-2,2,6,6-tetramethyl-1-piperidyl) ethanol.

The lubricants useful for the present invention include aliphatic hydrocarbons, e.g., paraffin wax, polyethylene wax and polypropylene wax; higher fatty acids, e.g., capric acid, lauric acid, myristic acid, palmitic acid, margaric acid, stearic acid, arachidic acid and behenic acid or salts thereof (e.g., lithium, calcium, sodium, magnesium or potassium salt);

aliphatic alcohols, e.g., palmitic alcohol, cetyl alcohol and stearyl alcohol;

aliphatic amides, e.g., caproic acid amide, caprilic acid amide, capric acid amide, lauric acid amide, myristic acid amide, palmitic acid amide and stearic acid amide; esters of an aliphatic compound and alcohol; and fluorine compounds, e.g., fluoroalkyl carboxylic acid or metallic salt thereof and metallic salts of fluoroalkyl sulfonates.

Each of the above additives may be blended at 0.0001 to 10 parts by weight per 100 parts by weight of the propylene-based polymer composition.

The propylene-based polymer composition of the present invention can form moldings further improved in properties, e.g., property balances, durability, coating characteristics, printing characteristics, resistance to scratching and moldability, by blending one or more of the above additives.

The propylene-based polymer composition of the present invention may be blended with a nucleating agent, as described above.

Various known nucleating agents may be used for the present invention without any restriction. Of these, the nucleating agents of aromatic phosphate ester salts and dibenzylidene sorbitol described below are preferable.

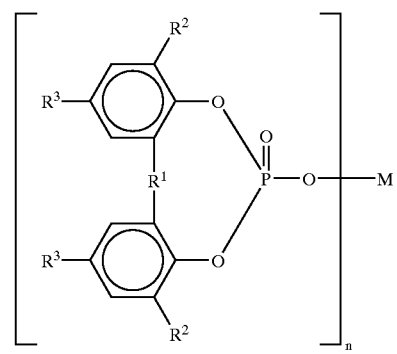

wherein, $R^1$ is oxygen, sulfur or a hydrocarbon group of 1 to 10 carbon atoms; $R^2$ and $R^3$ are each hydrogen or a hydrocarbon group of 1 to 10 carbon atoms, where $R^2$ and R³ may be the same or different, and R² and another R², R³ and another R³ or R² and R³ may be bound to each other to form a ring; M is a mono- to tri-valent metallic atom; and "n" is an integer of 1 to 3.

More concretely, they include:
sodium-2,2'-methylene-bis(4,6-di-tert-butylphenyl) phosphate,
sodium-2,2'-ethylidene-bis(4,6-di-tert-butylphenyl) phosphate,
lithium-2,2'-methylene-bis(4,6-di-tert-butylphenyl) phosphate,
lithium-2,2'-ethylidene-bis(4,6-di-tert-butylphenyl) phosphate,
sodium-2,2'-ethylidene-bis(4-1-propyl-6-tert-butylphenyl) phosphate,
lithium-2,2'-methylene-bis(4-methyl-6-tert-butylphenyl) phosphate,
lithium-2,2'-methylene-bis(4-ethyl-6-tert-butylphenyl) phosphate,
calcium-bis[2,2'-thiobis(4-methyl-6-tert-butylphenyl) phosphate,
calcium-bis[2,2'-thiobis(4-ethyl-6-tert-butylphenyl) phosphate,
calcium-bis[2,2'-thiobis(4,6-di-tert-butylphenyl) phosphate,
magnesium-bis[2,2'-thiobis(4,6 di-tert-butylphenyl) phosphate,
magnesium-bis[2,2'-thiobis(4-tert-octylphenyl) phosphate,
sodium-2,2'-butylidene-bis(4,6-di-methylphenyl) phosphate,
sodium-2,2'-butylidene-bis(4,6-di-tert-butylphenyl) phosphate,
sodium-2,2'-tert-octylmethylene-bis(4,6-di-methylphenyl) phosphate,
sodium-2,2'-tert-octylmethylene-bis(4,6-di-tert-butylphenyl) phosphate,
calcium-bis-(2,2'-methylene-bis(4,6-di-tert-butylphenyl) phosphate,
magnesium-bis-[2,2'-methylene-bis(4,6-di-tert-butylphenyl) phosphate],
barium-bis-[2,2'-methylene-bis(4,6-di-tert-butylphenyl) phosphate],
sodium-2,2'-methylene-bis(4-methyl-6-tert-butylphenyl) phosphate,
sodium-2,2'-methylene-bis(4-ethyl-6-tert-butylphenyl) phosphate,
sodium (4,4'-dimethyl-5,6'-di-tert-butyl-2,2'-biphenyl) phosphate,
calcium-bis[(4,4'-dimethyl-6,6'-di-tert-butyl-2,2'-biphenyl) phosphate],
sodium-2,2'-ethylidene-bis[(4-m-butyl-6-tert-butylphenyl) phosphate,
sodium-2,2'-methylene-bis(4,6-di-methylphenyl) phosphate,
sodium-2,2'-methylene-bis(4,6-di-ethylphenyl) phosphate,
potassium-2,2'-ethylidene-bis(4,6-di-tert-butylphenyl) phosphate,
calcium-bis[2,2'-ethylidene-bis(4,6-di-tert-butylphenyl) phosphate],
magnesium-bis[2,2'-ethylidene-bis(4,6-di-tert-butylphenyl) phosphate],
barium-bis[2,2'-ethylidene-bis(4,6-di-tert-butylphenyl) phosphate],
aluminum-tris[2,2'-methylene-bis(4,6-di-tert-butylphenyl) phosphate],
aluminum-tris[2,2'-ethylidene-bis(4,6-di-tert-butylphenyl) phosphate], and a combination thereof. Of these, sodium-2,2'-methylene-bis(4,6-di-tert-butylphenyl) phosphate is more preferable.

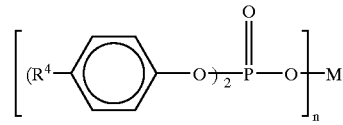

wherein, $R^4$ is hydrogen or a hydrocarbon group of 1 to 10 carbon atoms; M is a mono- to tri-valent metallic atom; and "n" is an integer of 1 to 3.

More concretely, they include:
sodium-bis(4-tert-butylphenyl) phosphate,
sodium-bis(4-methylphenyl) phosphate,
sodium-bis(4-ethylphenyl) phosphate,
sodium-bis(4-1-propylphenyl) phosphate,
sodium-bis(4-tert-octylphenyl) phosphate,
potassium-bis(4-tert-butylphenyl) phosphate,
calcium-bis(4-tert-butylphenyl) phosphate,
magnesium-bis(4-tert-butylphenyl) phosphate,
lithium-bis(4-tert-butylphenyl) phosphate,
aluminum-bis(4-tert-butylphenyl) phosphate, and a combination thereof. Of these, sodium-bis(4-tert-butylphenyl) phosphate is more preferable.

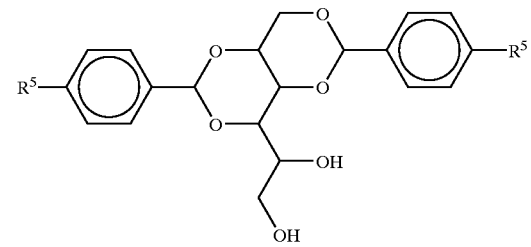

wherein, $R^5$ is hydrogen or a hydrocarbon group of 1 to 10 carbon atoms.

More concretely, they include:
1,3,2,4-dibenzylidene sorbitol,
1,3-benzylidene-2,4-p-methylbenzylidene sorbitol,
1,3-benzylidene-2,4-p-ethylbenzylidene sorbitol,
1,3-p-methylbenzylidene-2,4-benzylidene sorbitol,
1,3-p-ethylbenzylidene-2,4-benzylidene sorbitol,
1,3-p-methylbenzylidene-2,4-p-ethylbenzylidene sorbitol,
1,3-p-ethylbenzylidene-2,4-p-methylbenzylidene sorbitol,
1,3,2,4-di(p-methylbenzylidene) sorbitol,
1,3,2,4-di(p-ethylbenzylidene) sorbitol,
1,3,2,4-di(p-n-propylbenzylidene) sorbitol,
1,3,2,4-di(p-i-propylbenzylidene) sorbitol,
1,3,2,4-di(p-n-butylbenzylidene) sorbitol,
1,3,2,4-di(p-s-butylbenzylidene) sorbitol,
1,3,2,4-di(p-t-butylbenzylidene) sorbitol,
1,3,2,4-di(2',4'-dimethylbenzylidene) sorbitol,
1,3,2,4-di(p-methoxybenzylidene) sorbitol,
1,3,2,4-di(p-ethoxybenzylidene) sorbitol,
1,3-benzylidene-2,4-p-chlorobenzylidene sorbitol,
1,3-p-chlorobenzylidene-2,4-benzylidene sorbitol,
1,3-p-chlorobenzylidene-2,4-p-methylbenzylidene sorbitol,
1,3-p-chlorobenzylidene-2,4-p-ethylbenzylidene sorbitol,
1,3-p-methylbenzylidene-2,4-p-chlorobenzylidene sorbitol,
1,3-p-ethylbenzylidene-2,4-p-chlorobenzylidene sorbitol,
1,3,2,4-di(p-chlorobenzylidene) sorbitol, and a combination thereof. Of these, more preferable ones are 1,3,2,4-dibenzylidene sorbitol, 1,3,2,4-di(p-methylbenzylidene) sorbitol, 1,3,2,4-di(p-ethylbenzylidene) sorbitol, 1,3-p-chlorobenzylidene-2,4-p-methylbenzylidene sorbitol, 1,3,2,4-di(p-chlorobenzylidene) sorbitol, and a combination thereof.

The other nucleating agents useful for the present invention include metallic salts of aromatic and aliphatic carboxylic acids. More concretely, they include aluminum salts of benzoic acid and p-tert-butylbenzoic acid, sodium adipate, sodium thiophenecarboxylate and sodium pyrrolecarboxylate.

An inorganic compound, e.g., talc, may be used as the nucleating agent.

The above-described nucleating agent may be blended in copmosition at 0.001 to 10 parts by weight per 100 parts by weight of the propylene-based polymer [C-2], preferably 0.01 to 5 parts by weight, more preferably 0.1 to 3 parts by weight.

Blend of the nucleating agent can accelerate crystallization of the propylene-based polymer, make the grains finer during the crystallization process, and allow the polymer to be molded faster.

The propylene-based polymer composition (2) of the present invention can be formed into various shapes, e.g., film, sheet and pipe, by a forming method, e.g., extrusion, injection molding, inflation or calendering. The formed article is excellent in recovery from the strained conditions.

The propylene-based polymer composition (2) of the present invention can be widely used for various known purposes of formed polyolefin, e.g., sheet, film (stretched or not stretched), and filament.

These formed articles are produced by the known thermal forming processes, e.g., extrusion, injection molding, inflation, blow molding, extrusion-blow molding, injection-blow molding, pressing, vacuum molding, calendering and foaming.

These formed articles are described by several examples.

The formed articles related to the present invention are not limited in shape and type, and include sheet, film (not stretched), pipe, hose, wire coating and filament, when they are produced by extrusion. Of these, sheet, film and filament are more preferable.

The propylene-based polymer composition (2) of the present invention can be extruded by a known extruder under known forming conditions. For example, the molten composition is extruded by a monoaxial screw, kneading, ram or gear extruder through a T-die or the like into a sheet or film (not stretched).

The above extruded sheet or extruded film (not stretched) can be stretched by a known stretching process, e.g., tenter (longitudinal/transverse or transverse/longitudinal stretching), simultaneous biaxial stretching or monoaxial stretching.

The sheet or not stretched film is stretched at a stretching ratio normally in a range of around 20 to 70 folds in the case of biaxial stretching, and around 2 to 10 folds in the case of monoaxial stretching. The thickness of the obtainable stretched sheet is preferably around 5 to 200 $\mu$m.

An inflation film is one of the film-shaped formed articles for which the propylene-based polymer composition (2) of the present invention can be used. Inflation-formation using the composition (2) makes draw down of moldings difficult.

The formed article of the propylene-based polymer composition (2) of the present invention has various favorable properties, e.g., antistatic property, softness represented by tensile elastic modulus, resistance to heat and scratching, moldability, resistance to aging under heating, transparency, through-view property, gloss, rigidity, moisture-proofness, and gas barrier property. As such, it can be widely used for, e.g., packing film. Its moisture-proofness makes it particularly suitable for press through packs or the like, which is used for packing of tablets and capsules for medicines or the like.

The filament can be produced by, e.g., extruding the molten propylene-based polymer composition (2) through a spinneret. The filament thus produced may be further stretched, to an extent of molecular orientation at least in one direction, preferably at a stretching ratio normally in a range of around 5 to 10 folds. The filament of the propylene-based polymer composition (2) of the present invention has various favorable properties, e.g., antistatic property, transparency, rigidity, and resistance to heat and impact.

The propylene-based polymer composition (2) of the present invention can be also injection-molded into various shapes by a known injection molder under known conditions. The injection-molded article of the propylene-based polymer composition (2) of the present invention has various favorable properties, e.g., antistatic property, rigidity, resistance to heat and impact, surface gloss, and resistance to chemicals and wear. As such, it can find wide use, e.g., automobile interiors (e.g., trim), automobile exteriors (e.g., bumper, sidemolding and wheel cover), home electric appliance cases, and containers.

The propylene-based polymer composition (2) of the present invention can be also blow-molded by a known blow molder under known conditions.

Taking extrusion-blow molding as an example, the propylene-based polymer composition (2) of the present invention, molten at 100 to 300° C., is extruded through a die into a tubular parison, which is blown with air while being held in a mold of desired shape, and then put in a mold while being kept at 130 to 300° C., to form the hollow article. It is stretched (blown) preferably at a ratio of around 1.5 to 5 folds in he transverse direction.

When injection molding is used, the propylene-based polymer composition (2) of the present invention, molten at 100 to 300° C., is injected into a parison mold to form the parison, which is blown with air while being held in a mold of desired shape, and then put in a mold while being kept at 130 to 300° C., to form the hollow article.

It is stretched (blown) preferably at a ratio of around 1.1 to 1.8 folds in the longitudinal direction and 1.3 to 2.5 folds in the transverse direction.

The blow-molded article of the propylene-based polymer composition (2) of the present invention is excellent in transparency, rigidity, resistance to heat and scratching, and moldability.

The pressed article may be represented by the mold-stamped article. For example, when the base and surface materials are simultaneously pressed to form the composite, monolithic article by mold stamping, the propylene-based polymer composition (2) of the present invention can be used for the base.

The concrete examples of the mold-stamped articles include automobile interiors, e.g., door trim, rear package trim, seat back garnish and instrument panel.

The propylene-based polymer composition (2) of the present invention is transparent and highly rigid, showing a sufficient rigidity even when it is blended with, e.g., an elastomer. As such, it can find wide use, e.g., automobile interiors (e.g., trim), automobile exteriors (e.g., bumper, sidemolding and wheel cover), home electric appliance cases, and containers.

The pressed articles of the propylene-based polymer composition (2) of the present invention has various favorable properties, e.g., antistatic property, rigidity, resistance to heat, transparency, resistance to scratching, resistance to aging under heating, surface gloss, and resistance to chemicals and wear.

The propylene-based polymer composition of the present invention, comprising a propylene-based polymer incorporated with a specific ethylene/α-olefin copolymer and inorganic filler, has greatly improved balances between rigidity and tensile breaking point elongation, especially these properties at low temperature.

Third Propylene-based Resin Composition (3)

The third propylene-based polymer composition (3) of the present invention comprises the propylene-based polymer [C-3], ethylene/α-olefin copolymer [A], ethylene-based copolymer [B]. In other words, it comprises the propylene-based polymer [C-3] and ethylene/α-olefin copolymer composition [AB], and hence falls into the category of the propylene-based polymer composition (1).

The ethylene/α-olefin copolymer composition [AB] composed of the ethylene/α-olefin copolymer [A] and ethylene-based copolymer [B] for the second propylene-based polymer composition (2) can be suitably used also for the third propylene-based polymer composition (3).

For the third propylene-based polymer composition (3) of the present invention, the specific propylene/α-olefin copolymer [C-3] having the following properties is used. The propylene-based copolymer [C-3] may be block or random copolymer so long as it satisfies the following properties, the random copolymer being more preferable.

The propylene/α-olefin copolymer [C-3] has a melt flow rate (MFR, determined in accordance with ASTM D1238 at 190° C. and a load of 2.16 kg) of 0.1 to 400 g/10 minutes, preferably 0.1 to 200 g/10 minutes.

The propylene/α-olefin copolymer having an MFR in the above range can give the propylene/α-olefin copolymer composition which is excellent in fluidity and can be formed into a large-sized shape. The composition of the copolymer having an MFR more than 400 g/10 minutes may have a deteriorated impact resistance (Izod impact strength).

The propylene/α-olefin copolymer [C-3] contains at least one type of α-olefin of 2 to 20 carbon atoms other than propylene at 1.5 to 10% by mole, preferably 1.5 to 8%.

The α-olefins of 2 to 20 carbon atoms other than propylene include ethylene, 1-butene, 1-pentene, 1-hexene, 1-heptene, 1-octene, 1-decene, 1-dodecene, 1-hexadecene and 4-methyl-1-pentene, of which ethylene, 1-butene, 1-hexene and 1-octene are more preferable.

The propylene/α-olefin copolymer [C-3] has an intrinsic viscosity [η] of 0.01 to 10 dl/g, determined in decalin at 135° C., preferably 0.5 to 6 dl/g, more preferably 1.0 to 4 dl/g. The copolymer [C-3] having an intrinsic viscosity in the above range can be mixed with another component more easily, and the resultant composition tends to give the formed article of high mechanical strength.

The propylene/α-olefin copolymer [C-3] preferably has a GPC-determined molecular weight distribution (Mw/Mn) of 6 or less, more preferably 1.5 to 5. The copolymer [C-3] having an Mw/Mn value more than 6 may have deteriorated transparency.

The propylene/α-olefin copolymer [C-3] preferably has a glass transition temperature Tg of −10° C. or less, measured by a differential scanning calorimeter (DSC), preferably −13° C. or less. The copolymer [C-3] having a glass transition temperature Tg exceeding the above limit may have deteriorated softness.

The propylene/α-olefin copolymer [C-3] preferably has a temperature Tm at the maximum peak in the endothermic curve, measured by a differential scanning calorimeter (DSC), i.e., melting point, satisfying the relationship $70 < T_m < 155 - 5.5(100-P)$, preferably $90 < T_m < 155 - 5.5(100-P)$, wherein P is the propylene content (% by mole) in the copolymer.

The copolymer [C-3] tends to have excellent transparency and anti-blocking property, when its Tm level satisfy the above relationship.

It is preferable that the propylene/α-olefin copolymer [C-3] have a microisotacticity of 0.8 or more, more preferably 0.85 or more, with respect to the triad chains of propylene. The copolymer [C-3] having a microisotacticity in the above range tends to have a high crystallization rate and good processability.

Microisotacticity (hereinafter referred to as triad tacticity or mm fraction) with respect to the triad chains is described.

Triad tacticity (mm fraction) with respect to the triad chains is defined as intensity (area) ratio of the second side-chain methyl group in the head-tail bonded triad propylene chains, determined by the $^{13}$C-NMR spectroscopy. It is given by the following relationship (2):

$$mm \text{ fraction} = PPP(mm)/[PPP(mm)+PPP(mr)+PPP(rr)] \quad (2)$$

wherein, PPP (mm), PPP (mr) and PPP (rr) are each an area of the second side-chain methyl group in the head-tail bonded triad propylene chains observed by the $^{13}$C-NMR spectroscopy in each shift region, described below:

| First region<br>21.0 to 21.9 ppm | Second region<br>20.3 to 21.0 ppm | Third region<br>19.5 to 20.3 ppm |
|---|---|---|
| PPP (mm) | PPP (mr) | PPP (rr) | wherein,
P is the propylene-derived unit.

wherein, P is the propylene-derived unit

The PPP (mm), PPP (mr) and PPP (rr) represent the respective head-tail bonded triad propylene chain structures described below:

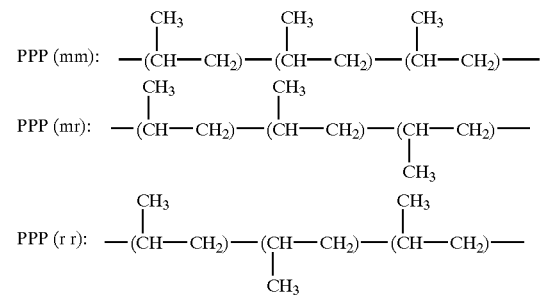

In the methyl carbon region (19 to 23 ppm), there are the following side-chain methyl group peaks of the propylene unit in the other chains, in addition to those of the head-tail bonded triad propylene chains, and the peak areas of these other types of methyl group are corrected to determine mm fraction by the procedure described below, wherein E is the ethylene-derived unit:

(1) In the second region, there observed a peak derived from the side-chain methyl group, observed in the second unit (propylene unit) in the PPE triad chain in which propylene is bonded to another propylene in the head-tail bonding manner.

The peak area of the above methyl group can be determined from the peak area of the methine group (resonating at around 30.6 ppm) of the second unit (propylene unit) in the PPE triad chain.

(2) In the third region, there observed a peak derived from the side-chain methyl group in the second unit (propylene unit) in the EPE triad chain.

The peak area of the above methyl group can be determined from the peak area of the methine group (resonating at around 32.9 ppm) of the second unit (propylene unit) in the EPE triad chain.

(3) In the second and third regions, there observed peaks derived from the methyl groups C to E' in the position-irregular units, shown in the following partial structures (i), (ii) and (iii).

The peaks of the methyl groups C, D and D' are observed in the second region, and those of the methyl groups E and E' in the third region.

Of the peaks of the methyl groups of the position-irregular units (i), (ii) and (iii), those of the methyl groups A and B, observed at 17.3 and 17.0 ppm, respectively, are not found in the first to third regions.

position [AB] as the modifier improves softness and transparency of the polypropylene-based resin while keeping its inherent resistance to heat.

It is preferable that the propylene/α-olefin copolymer [C-3] of the present invention has a damping factor (tan δ) peak caused from the glass transition temperature of the propylene/α-olefin copolymer [C-31 and that caused from the glass transition temperature of the ethylene/α-olefin copolymer composition [AB], when the temperature-dependence of the modulus of elasticity is measured at intervals of 3° C., and that these peaks are separated from each other.

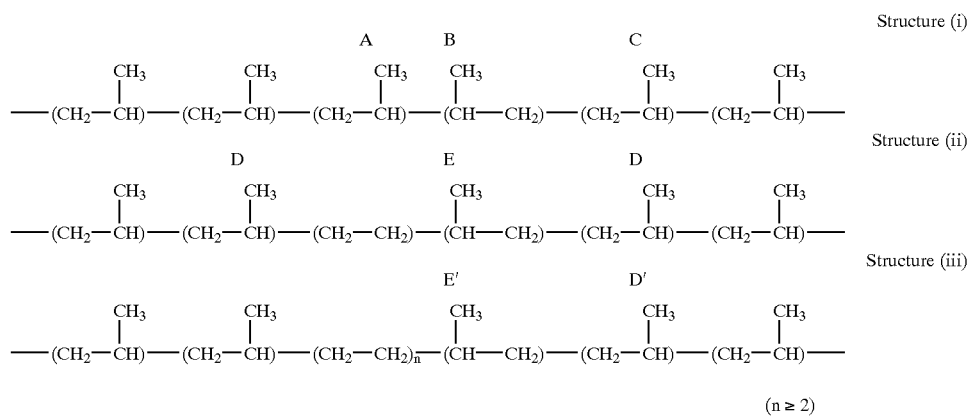

The peak area of the methyl group C can be determined from the peak area of the adjacent methine group (resonating at around 31.3 ppm).

The peak area of the methyl group D can be determined by halving totaled areas of the peaks relevant to the αβ methylene carbon of the structure (ii) (resonating at around 34.3 and 34.5 ppm).

The peak area of the methyl group D' can be determined from the peak area of the methine group (resonating at around 33.3 ppm) adjacent to the methyl group E' of the structure (iii).

The peak area of the methyl group E can be determined from the peak area of the adjacent methine carbon (resonating at around 33.7 ppm).

The peak area of the methyl group E' can be determined from the peak area of the adjacent methine carbon (resonating at around 33.3 ppm).

The peak area of the second side-chain methyl group in the head-tail bonded triad propylene chains can be found by subtracting the above peak areas from the total peak area of the second and third regions.

Each carbon peak in the spectral pattern can be allocated by referring to the literature (Polymer, 30, 1350 (1989)).

The propylene-based polymer composition (3) of the present invention comprises the propylene/α-olefin copolymer [C-3] at 20 to 95% by weight, preferably 30 to 85% by weight, and ethylene/α-olefin copolymer composition [AB] at 5 to 80%, preferably 15 to 70% The ethylene/α-olefin copolymer composition [AB] as a modifier shows the sufficient modification effects of improving softness and impact resistance when blended at the upper limit or less, and is less likely to deteriorate the inherent properties of the propylene/α-olefin copolymer [C-3], e.g., rigidity when incorporated at the lower limit or more.

When blended in the propylene/α-olefin copolymer [C-3] at the given content, the ethylene/α-olefin copolymer com- The propylene-based polymer composition may be insufficient both in impact resistance and rigidity, when these peaks are not distinctly "separated" but are "fused" with each other.

The propylene-based polymer composition [C-3] of the present invention may comprise, in addition to the above-described components, one or more additives within limits not harmful to the object of the present invention. The additives useful for the present invention include a nucleating agent, antioxidant, hydrochloric acid absorber, heat stabilizer, light stabilizer, ultraviolet absorber, lubricant, antistatic agent, flame retardant, pigment, dye, dispersant, copper inhibitor, neutralizer, foaming agent, plasticizer, antifoaming agent, crosslinking agent, flow improver (e.g., peroxide), and weld strength improver. Types of these additives and contents in the composition are similar to those described for the second propylene-based polymer composition (2).

The propylene-based polymer composition (3) of the present invention can be formed into various shapes, e.g., film, sheet and pipe, by a forming method, e.g., extrusion, injection molding, inflation or calendering. The formed article is excellent in recovery from the strained conditions.

The propylene-based polymer composition (3) of the present invention (sometimes referred to as soft propylene-based polymer composition) can be widely used for various known purposes of formed polyolefin, e.g., sheet, film (stretched or not stretched), and filament, as is the case with the second propylene-based polymer composition (2).

These formed articles are produced by the known thermal forming processes, e.g., extrusion, injection molding, inflation, blow molding, extrusion-blow molding, injection-blow molding, pressing, vacuum molding, calendering and foaming.

These formed articles are described by several examples.

The formed articles related to the present invention are not limited in shape and type, and include sheet, film (not stretched), pipe, hose, wire coating and filament, when they are produced by extrusion. Of these, sheet, film and filament are more preferable.

The propylene-based polymer composition (3) of the present invention can be extruded by a known extruder under known forming conditions, as is the case with the second propylene-based polymer composition (2). For example, the molten composition is extruded by a monoaxial screw, kneading, ram or gear extruder through a T-die or the like into a sheet or film (not stretched).

The above extruded sheet or extruded film (not stretched) can be stretched by a known stretching process, e.g., tenter (longitudinal/transverse or transverse/longitudinal stretching), simultaneous biaxial stretching or monoaxial stretching. The sheet or not stretched film is stretched at a stretching ratio normally in a ratio of around 20 to 70 folds in the case of biaxial stretching, and around 2 to 10 folds in the case of monoaxial stretching. The thickness of the obtainable stretched sheet is preferably stretched to a thickness of around 5 to 200 $\mu$m.

An inflation film is one of the film-shaped formed articles for which the propylene-based polymer composition (3) of the present invention can be used. Inflation formation using the composition (3) makes draw down of moldings difficult. The composition (3), when inflation-formed, is resistant to draw down.

The formed article of the propylene-based polymer composition (3) of the present invention, e.g., sheet or film, has various favorable properties, e.g., antistatic property, softness represented by tensile elastic modulus, resistance to heat and scratching, moldability, resistance to aging under heating, transparency, through-view property, gloss, rigidity, moisture-proofness, and gas barrier property. As such, it can be widely used for, e.g., packing film. Its moisture-proofness makes it particularly suitable for press through packs or the like, which is used for packing of, e.g., tablets and capsules for medicines. It is also suitable for medical bags, especially transfusion bags, excellent in gas barrier property, transparency or the like, which are produced by putting the sheets one on another and joining the given portions by a conjugation method, e.g., heat sealing or high-frequency induction heating.

The filament can be produced by, e.g., extruding the molten propylene-based polymer composition (3) through a spinneret. The filament thus produced may be further stretched, to an extent of molecular orientation at least in one direction, preferably at a stretching ratio normally in a range of around 5 to 10 folds. The filament of the propylene-based polymer composition (3) of the present invention has various favorable properties, e.g., antistatic property, softness, and resistance to heat and impact.

The propylene-based polymer composition (3) of the present invention can be also injection-molded into various shapes by a known injection molder under known conditions. The injection-molded article of the propylene-based polymer composition (3) of the present invention has various favorable properties, e.g., antistatic property, softness, resistance to heat and impact, transparency, surface gloss, and resistance to chemicals and wear. As such, it can find wide use, e.g., dress cases, miscellaneous goods, automobile surface materials, and containers such as medical containers.

The propylene-based polymer composition (3) of the present invention can be also blow-molded by a known blow molder under known conditions. Taking extrusion-blow molding as an example, the propylene-based polymer composition (3) of the present invention, in molten state at 100 to 300° C., is extruded through a die into a tubular parison, which is blown with air while being held in a mold of desired shape, and then put in a mold while being kept at 130 to 300° C., to form the hollow article. It is stretched (blown) preferably at a ratio of around 1.5 to 5 folds in the transverse direction.

When injection-blow molding is used, the propylene-based polymer composition (3) of the present invention, molten at 120 to 300° C., is injected into a parison mold to form the parison, which is blown with air while being held in a mold of desired shape, and then put in a mold while being kept at 130 to 300° C., to form the hollow article.

Stretched (blown) ratio of the article is preferably in the range of around 1.1 to 1.8 in the longitudinal direction and 1.3 to 2.5 in the transverse direction.

The blow-molded article made from the propylene-based polymer composition (3) of the present invention is excellent in transparency, softness, resistance to heat and scratching, and moldability.

The pressed article may be represented by the mold-stamped article. For example, when the substrate and skin materials are simultaneously pressed to form the composite, monolithic article by mold stamping, the propylene-based polymer composition (3) of the present invention can be used for the substrate.

The concrete examples of the mold-stamped articles include automobile interiors, e.g., door trim, rear package trim, seat back garnish and instrument panel.

The pressed articles of the propylene-based polymer composition (3) of the present invention has various favorable properties, e.g., antistatic property, softness, resistance to heat, transparency, resistance to scratching, resistance to aging under heating, surface gloss, and resistance to chemicals and wear.

The third propylene-based polymer composition (3) of the present invention, comprising a specific propylene-based copolymer and ethylene/$\alpha$-olefin copolymer composition, can have greatly improved balances with respect to softness, and resistance to heat and impact.

EXAMPLES

The present invention is described more concretely by EXAMPLES, which by no means limit the present invention.

The properties of each resin components were evaluated by the following methods:

1. Properties of the Ethylene/$\alpha$-olefin Copolymer [A]

[Density]

The strand, measured for MFR at 190° C. and a load of 2.16 kg, was thermally treated at 120° C. for 1 hour, and slowly cooled to room temperature in 1 hour, to determine density by the density gradient tube method.

[$\alpha$-Olefin Content, and T$\alpha\beta$/T$\alpha\alpha$, and B Value]

Determined by the $^{13}$C-NMR Spectroscopy.

[Intrinsic Viscosity [$\eta$]]

Determined in decalin at 135° C.

[Mw/Mn]

Determined by gel permeation chromatography (GPC) at 140° C. with o-dichlorobenzene as the solvent.

[MFR$_{10}$/MFR$_2$]

Melt flow rates $MFR_{10}$ and $MFR_2$ were determined in accordance with ASTM D1238 at 190° C. and a load of 10 kg for the former ($MFR_{10}$) and 190° C. and a load of 2.16 kg for the latter ($MFR_2$), and the ratio was calculated. The higher a $MFR_{10}/MFR_2$ ratio is, the higher the fluidity of the molten polymer composition becomes, in other words, the higher the processability of the molten polymer components becomes.

[Glass Transition Temperature]

Determined from the endothermic curve, drawn by heating the sample from room temperature at 20° C./minute to 200° C., at which it was held for 5 minutes, then cooling it at 10° C./minute to −150° C., and heating it again at 10° C./minute.

[Crystallinity]

Determined by dividing the heat of fusion per unit mass, found from the DSC-determined endothermic peak, by 70 cal/g as the heat of fusion of the polyethylene crystal.

2. Properties of the Ethylene-based Copolymer [B] and Propylene-based Copolymer [C]

[Density]

The strand, measured for MFR at 190° C. and a load of 2.16 kg, was thermally treated at 120° C. for 1 hour, and slowly cooled to room temperature in 1 hour, to determine density by the density gradient tube method.

[α-Olefin Content]

Determined by the $^{13}$C-NMR spectroscopy.

[Melt Tension (MT)]

Determined by measuring the stress in the molten polymer stretched at a constant rate. The pelletized polymer sample was measured by an MT meter (Toyo Seiki Seisakusho) under the conditions of resin temperature: 190° C., extrusion speed: 15 mm/minute, winding speed: 10 to 20 m/minute, nozzle diameter: 2.09 mm and nozzle length: 8 mm.

[MFR]

$MER_2$ was determined in accordance with ASTM D1238 at a given temperature and load of 2.16 kg.

[Softening Temperature ($T_m$)]

Tm was regarded as the maximum peak temperature in the endothermic curve determined by a DSC. Measurement is conducted by heating the sample put in an aluminum pan at 10° C./minute to 200° C., at which it was held for 5 minutes, then cooling it at 20° C./minute to room temperature, and heating it again at 10° C./minute, thereby determining the endothermic curve.

3. Properties of the Ethylene/α-olefin Copolymer Composition and Propylene-based Copolymer Composition

[Bending Modulus of Elasticity (FM)]

Determined in accordance with ASTM D790.

Test piece: 12.7 mm wide, 3.2 mm thick, and 127 mm long;

Span: 64 mm;

Bending speed: 20 mm/minute

[Tensile Modulus of Elasticity]

Determined in accordance with JIS K6301.

Span: 30 mm

Temperature: 23° C.

Stretching speed: 30 mm/minute

[Izod Impact Strength (IZ)]

Determined in accordance with ASTM D256 with the following test piece:

Temperature: 23° C. and −30° C.

Test piece: 12.7 mm wide, 6.4 mm thick, and 64 mm long

Notch: Provided by machining

[Rockwell Hardness]

Determined in accordance with ASTM D785 with the following test piece:

Test piece: 110 mm square (110 mm longitudinal×110 mm transversal) and 3 mm long R scale Temperature: 23° C.

[JIS A Hardness]

Determined in accordance with JIS K7215 with the following test piece prepared by pressing:

Test piece: 35 mm square (35 mm longitudinal×35 mm transversal) and 3 mm long

Temperature: 23° C.

[Viscoelasticity]

Temperature-dependence of dynamic viscoelasticity was measured by a Rheotometrics's RDS II at a frequency of 62.5 rad/second in a temperature range from −80 to 50° C., to judge whether the damping factor (tan δ) peak derived from the glass transition temperature of the propylene-based copolymer [C] and that derived from the glass transition temperature of the ethylene/α-olefin copolymer composition are separated or fused.

Production Example 1

845 ml of hexane kept at 23° C. was put in a 2-liter capacity stainless autoclave equipped with an agitator was sufficiently purged with nitrogen. 155 ml of 1-butene was added with agitation, while it was cooled with ice water, to the autoclave. Then, the autoclave was heated to 60° C. inside, and pressurized with ethylene to 8 kg/cm² as the total pressure. When the inside pressure reached 8 kg/cm², 1.0 ml of a 1.0 mM/ml decane solution of triisobutyl aluminum (TIBA) was carried by nitrogen into the autoclave under pressure, and then 0.3 ml of a toluene solution prepared beforehand to contain 0.3 mM (as Al) of methyl aluminoxane and 0.001 mM of rac-dimethylsilylene-bis[1-(2-methyl-4-phenyl-indenyl)] zirconium dichloride was carried by nitrogen into the autoclave under pressure, to start the polymerization.

Temperature in the autoclave was controlled at 60° C. and ethylene was directly charged to keep pressure at 8 kg/cm² in the autoclave for 30 minutes. Methanol (5 ml) was pumped into the autoclave 30 minutes after the polymerization was started, to terminate the polymerization, and pressure in the autoclave was released to the atmospheric pressure. Then, 2-liter of acetone was added to the effluent.

The solvent-containing, rubber ball-shaped polymer thus prepared was dried under the conditions of 130° C. and 600 torr for 13 hours. This produced 47 g of ethylene/1-butene copolymer containing 39 mmol of 1-butene.

Table 1 gives the basic properties of the ethylene/1-butene copolymer (A1) thus prepared. The ethylene/α-olefin copolymers (A2) to (A4), ethylene-based copolymers (B1) to (B5), and propylene-based polymer (C1) were prepared in the same manner as in the above, except that the monomer types and charge quantities were changed to have the copolymer compositions shown in Table 1. Table 1 also gives the basic properties of the ethylene/α-olefin copolymers (A2) to (A4), ethylene-based copolymers (B1) to (B5), and propylene-based polymer (C1).

TABLE 1

| Copolymers | A1 | A2 | A3 | A4 | B1 | B2 | B3 | B4 | B5 | C1 |
|---|---|---|---|---|---|---|---|---|---|---|
| α-olefin types | 1-butene | 1-hexene | 1-octene | 1-butene | 1-butene | 1-octene | 1-butene | 1-hexene | 1-hexene | propylene |
| Ethylene contents (mol) | 61 | 66 | 66 | 30 | 84 | 84 | 90 | 95.2 | 98.6 | not included |
| Density (g/cm) | 0.86 | 0.855 | 0.855 | 0.861 | 0.872 | 0.873 | 0.89 | 0.908 | 0.938 | 0.91 |
| [η] | 2.3 | 2.2 | 2.1 | 2.2 | 1.4 | 1.4 | 1.4 | 1.4 | 1.2 | |
| Mw/Mn | 2.4 | 2.3 | 2.3 | 2.5 | | | | | | |
| MFR (g/10 min) | | | | | 4.1 | 4.3 | 4.2 | 1.7 | 4.5 | 55 |
| $MFR_{10}/MFR_2$ | 10.2 | 9.9 | 9.6 | 10.5 | | | | | | |
| MT(g) | | | | | 0.5 | 0.4 | 0.6 | 1.2 | 0.4 | |
| Tg(° C.) | −64 | −68 | −69 | −59 | −59 | −62 | −53 | | | |
| Crystallinity | 0 | 0 | 0 | 0 | | | | | | |
| Tm(° C) | | | | | 56 | 64 | 84 | 94 | 118 | 167 |
| 400 × d-250 | | | | | 99 | 99 | 106 | 113 | 125 | 131 |
| T αβ/T αα | <0.01 | <0.01 | <0.01 | <0.01 | <0.01 | <0.01 | <0.01 | <0.01 | <0.01 | <0.01 |
| B value | 1.11 | 1.07 | 1.08 | 1 | 1.03 | 1.04 | 1 | 1 | 1.03 | 1.04 |

Example 1

A mixture of 20% by weight of the ethylene/1-butene copolymer (A1) and 80% by weight of the ethylene-based copolymer (B1) was kneaded by a Lab-plastomill (Toyo Seiki, Ltd.) at 60 rpm and 200° C. for 5 minutes and pelletized, to have the pre-blend pellets of the ethylene/α-olefin copolymer composition. The pellets were subjected to the pellet blocking test, to evaluate the blocking property. The result is given in Table 1.

[Pellet Blocking Test]

The pellets, put in a polyethylene bag, were allowed to stand under a load of 100 g/cm² for 72 hours in an oven kept at 35° C., and withdrawn to observe the blocking conditions. They were rated by the following marks:

⊚: Blocking is rarely observed.
○: Blocking is observed, but the agglomerated pellets can be easily loosened by the finger.
Δ: Blocking is observed, but the agglomerated pellets can be loosened, when pressed by the finger.
X: The pellets are fused with each other into a veil-like condition.

Examples 2 to 7

The pellets of the ethylene/α-olefin copolymer compositions were prepared in the same manner as in EXAMPLE 1, except for the compositions shown in Table 2 and subjected to the pellet blocking tests also in the same manner as in EXAMPLE 1. The pellets of each composition were resistant to blocking and handled easily.

The pellets prepared in EXAMPLES 3 to 7 were also measured for the component soluble in decane at room temperature (% by weight), ethylene content and softening point ($T_m$).

The results are given in Table 2.

Comparative Examples 1 to 5

The pellets were prepared in the same manner as in EXAMPLE 1, except for the compositions shown in Table 2, and measured for MFR, blocking property, the component soluble in decane at room temperature (% by weight), ethylene content, the component soluble in decane at room temperature (% by weight) and softening temperature ($T_m$). The pellets prepared in each of the comparative examples showed blocking, and were difficult to handle.

The results are given in Table 2.

TABLE 2

| | | Example 1 | Example 2 | Example 3 | Example 4 | Example 5 | Example 6 | Example 7 | Comp Ex. 1 | Comp Ex. 2 | Comp Ex. 3 | Comp Ex. 4 | Comp Ex. 5 |
|---|---|---|---|---|---|---|---|---|---|---|---|---|---|
| compositions | A1 | 20 | 20 | 20 | 20 | 20 | | | | 100 | | | |
| | A2 | | | | | | 20 | | | | 100 | | |
| | A3 | | | | | | | 20 | | | | 100 | |
| | A4 | | | | | | | | 20 | | | | 100 |
| | B1 | 80 | | | | | 80 | 80 | 80 | | | | |
| | B2 | | 80 | | | | | | | | | | |
| | B3 | | | 80 | | | | | | | | | |
| | B4 | | | | 80 | | | | | | | | |
| | B5 | | | | | 80 | | | | | | | |
| MFR(g/10 min) | | 2.6 | 2.7 | 2.6 | 1.3 | 2.8 | 2.7 | 2.7 | 2.4 | 0.4 | 0.5 | 0.5 | 0.3 |
| Component soluble in decane at room temperature | Content (% by weight) | | | 20 | 20 | 20 | 22 | 22 | 28 | 100 | 100 | 100 | 100 |
| | Ethylene content % by mole) | | | 62 | 61 | 61 | 69 | 69 | 44 | 61 | 66 | 66 | 36 |
| Tm(° C.) | | | | 89 | 84 | — | 56 | 56 | 56 | — | — | — | — |
| Blocking property | | ⊚ | ⊚ | ⊚ | ⊚ | ⊚ | ⊚ | ⊚ | ○ | x | x | x | x |

Example 8

A mixture of 20% by weight of the ethylene/1-butene copolymer (A1) and 80% by weight of the ethylene-based copolymer (B1) was kneaded by a Lab-plastomill (Toyo Seiki, Ltd.) at 60 rpm and 200° C. for 5 minutes and pelletized, to have the pre-blend pellets. Then, 30% by weight of the pre-blend pellets of the ethylene/α-olefin copolymer/ethylene-based copolymer composition was incorporated with 70% by weight of the propylene-based polymer (C1), and 0.1% by weight of calcium stearate, 0.1% by weight of Inganox 1010 and 0.1% by weight of Inganox 168 as the stabilizers. The mixture was kneaded by a Lab-plastomill (Toyo Seiki, Ltd.) at 150 rpm and 200° C. for 5 minutes and pelletized.

The pellets were pressed at 230° C., and measured for breaking point strength, bending modulus of elasticity, impact strength and viscoelasticity by the following methods.

[Breaking Point Strength (TS)]

Determined in accordance with ASTM D638 at room temperature.

Examples 9 to 12

The formed articles were prepared in the same manner as in EXAMPLE 8, except that the ethylene/α-olefin copolymer and ethylene-based polymer shown in Table 3 were used for each of the examples, and were evaluated also in the same manner as in EXAMPLE 8.

The results are given in Table 3.

Comparative Examples 6 to 11

The formed articles were prepared in the same manner as in EXAMPLE 8, except that the ethylene/α-olefin copolymer and ethylene-based polymer shown in Table 3 were used for each of the examples, and were evaluated also in the same manner as in EXAMPLE 8.

The results are given in Table 3.

TABLE 3

| | | Example 8 | Example 9 | Example 10 | Example 11 | Example 12 | Comp Ex. 6 | Comp Ex. 7 | Comp Ex. 8 | Comp Ex. 9 | Comp Ex. 10 | Comp Ex. 11 |
|---|---|---|---|---|---|---|---|---|---|---|---|---|
| Ethylene/α-olefin copolymer | A1 | 6 | | | 6 | 6 | 6 | 6 | | 30 | | |
| | A2 | | 6 | | | | | | | | 30 | |
| | A3 | | | 6 | | | | | | | | 30 |
| | A4 | | | | | | | | | 6 | | |
| Ethylene-based polymer | B1 | 24 | 24 | 24 | | | | | 24 | | | |
| | B2 | | | | 24 | | | | | | | |
| | B3 | | | | | 24 | | | | | | |
| | B4 | | | | | | 24 | | | | | |
| | B5 | | | | | | | 24 | | | | |
| Proplyene-based copolymer C1 | | 70 | 70 | 70 | 70 | 70 | 70 | 70 | 70 | 70 | 70 | 70 |
| Component soluble in decane at room temperature | Content (% by weight) | | | | | 6.1 | | 6 | | 30 | | |
| | Ethylene content (% by mole) | | | | | 62 | | 60 | | 61 | | |
| Component soluble in decane at 63° C. | Content (% by weight) | | | | | 30.8 | | 6.8 | | 30.6 | | |
| | Tm(° C.) | | | | | 89 | | — | | — | | |
| Characteristics | TS(MPa) | 21 | 23 | 23 | 25 | 27 | 28 | 29.5 | 20 | 18 | 18 | 18 |
| | FM(MPa) | 1300 | 1350 | 1380 | 1350 | 1400 | 1450 | 1530 | 1200 | 800 | 780 | 750 |
| | IZ(J/m) | 30 | 33 | 35 | 35 | 35 | 20 | 15 | 20 | 22 | 24 | 25 |
| | Tan δ peaks | Separated | Separated | Separated | Separated | Separated | Separated | Separated | Separated | Fused | Fused | Fused |

[Bending Modulus of Elasticity]

Determined in accordance with ASTM D790 with the 2 mm thick test piece injection-molded under given conditions under the conditions of span: 32 mm and bending speed: 5 m/minute.

[Impact Strength (IZ)]

Determined in accordance with ASTM D256 with the 3 mm thick test piece (rear notch) at −30° C.

[Viscoelasticity]

Temperature-dependence of dynamic viscoelasticity was measured by a Rheotometrics's RDS II at a frequency of 62.5 rad/second in a temperature range from −80 to 50° C., to judge whether the damping factor (tan δ) peak derived from the glass transition temperature of the propylene-based copolymer [C] and that derived from the glass transition temperature of the ethylene/α-olefin copolymer composition are separated or fused.

As shown in Table 3, it is apparent that the propylene-based polymer compositions prepared in EXAMPLES 8 to 12 were well-balanced with respect to breaking point strength, bending modulus of elasticity and impact strength.

The formed articles of the compositions prepared in COMPARATIVE EXAMPLES 6 and 7 (which used the ethylene-based copolymer [B] of high density) and that of the one prepared in COMPARATIVE EXAMPLE 8 (which used the ethylene/α-olefin-based copolymer [A] containing a high content of the α-olefin) were not well-balanced with respect to impact strength and bending modulus of elasticity, i.e., low impact strength for a high bending modulus of elasticity.

The formed articles of the compositions prepared in COMPARATIVE EXAMPLES 9 to 11, containing no ethylene-based copolymer [B], were low both in impact strength and bending modulus of elasticity.

Example A1

A mixture of 20% by weight of the ethylene/1-butene copolymer (A1), prepared in PRODUCTION EXAMPLE 1, and 80% by weight of the ethylene-based copolymer (B1) was kneaded by a Lab-plastomill (Toyo Seiki, Ltd.) at 60 rpm and 200° C. for 5 minutes and pelletized, to obtain the pre-blend pellets of the ethylene/α-olefin copolymer/ethylene-based copolymer composition (AB-1). The pre-blend pellets were evaluated for tensile modulus of elasticity and JIS A hardness. The result is given in Table 4.

Examples A2 to A-5, and Comparative Examples A1 and A2

The pre-blend pellets (AB-2) to (AB-7) were prepared in the same manner as in EXAMPLE 13, except for the compositions shown in Table 4, and were evaluated for tensile modulus of elasticity and JIS A hardness. The result is given in Table 4.

TABLE 4

|  |  | Ex. A1 | Ex. A2 | Ex. A3 | Ex. A4 | Ex. A5 | Comp Ex. A1 | Comp Ex. A2 |
|---|---|---|---|---|---|---|---|---|
| Pellet compositions |  | AB-1 | AB-2 | AB-3 | AB-4 | AB-5 | AB-6 | AB-7 |
| Compositions | A1 | 20 | 20 | 20 |  |  | 20 |  |
|  | A2 |  |  |  | 20 |  |  |  |
|  | A3 |  |  |  |  | 20 |  |  |
|  | A4 |  |  |  |  |  |  | 20 |
|  | B1 | 80 |  |  |  |  |  |  |
|  | B2 |  | 80 |  | 80 | 80 |  | 80 |
|  | B3 |  |  | 80 |  |  |  |  |
|  | B4 |  |  |  |  |  | 80 |  |
| Density ratio (d2/d1) |  | 1.01 | 1.02 | 1.03 | 1.02 | 1.02 | 1.06 | 1.01 |
| Tensile modulus of elasticity (MPa) |  | 3.6 | 3.8 | 15.1 | 3.2 | 3.3 | 20.3 | 1.5 |
| JIS A hardness |  | 54 | 56 | 73 | 54 | 54 | 77 | 45 |

Example A6

A molten mixture of 24% by weight of the pellets of the ethylene/1-butene copolymer composition (AB-1), prepared in EXAMPLE A1, 66% by weight of the homopolypropylene (C1), 10% by weight of talc, and 0.1% by weight of calcium stearate, 0.1% by weight of Inganox 1010 and 0.1% by weight of Inganox 168 as the stabilizers was kneaded by a biaxial extruder at 200° C., and pelletized. The pellets were injection-molded by a 55 tons injection molder (Toshiba Kikai) at 200° C. as cylinder temperature and 40° C. as mold temperature, and were evaluated for their properties.

The polypropylene (C1) and talc used in this example are described in Table 5.

TABLE 5

|  | C1 | C2 |
|---|---|---|
| Polypropylene types | Polypropylene types | Block polypropylene |
| MFR(g/10 min) | 55 | 65 |
| Component soluble in decane at room temperature (% by weight) | 0.7 | 10.5 |

TABLE 5-continued

|  |  |  |
|---|---|---|
| Intrinsic viscosity [η] (dl/g) of the component soluble in decane at room temperature | 0.7 | 8.2 |
| I5 of the component soluble in decane at room temperature | 0.982 | 0.976 |
| MFR (g/10 minutes) of the component soluble in decane at room temperature | — | 135 |

|  | (D) Talc |
|---|---|
| Average particle size (mm) | 2.5 |

The results are given in Table 6.

Example A7

The pellets were formed in the same manner as in EXAMPLE A6, except that the ethylene/1-butene copolymer composition (AB-1) was replaced by the ethylene/α-olefin copolymer composition (AB-2) of different α-olefin content, and were evaluated for their properties.

The results are given in Table 6.

Example A8

The pellets were formed in the same manner as in EXAMPLE A6, except that the ethylene/1-butene copolymer composition (AB-1) was replaced by the ethylene/α-olefin copolymer composition (AB-3) of different α-olefin type and content, and were evaluated for their properties.

The results are given in Table 6.

Example A9

The pellets were formed in the same manner as in EXAMPLE A6, except that the ethylene/1-butene copolymer composition (AB-1) was replaced by the ethylene/α-olefin copolymer composition (AB-4) of different α-olefin type and content, and were evaluated for their properties.

The results are given in Table 6.

Example A10

The pellets were formed in the same manner as in EXAMPLE A6, except that the ethylene/1-butene copolymer composition (AB-1) was replaced by the ethylene/α-olefin copolymer composition (AB-5) of different α-olefin type and content, and were evaluated for their properties.

The results are given in Table 6.

Example A11

A molten mixture of 25% by weight of the pellets of the ethylene/1-butene copolymer composition (AB-1), prepared in EXAMPLE A1, 29% by weight of the homopolypropylene (C1), 36% by weight of the block polypropylene (C2), 10% by weight of talc, and 0.1% by weight of calcium stearate, 0.1% by weight of Inganox 1010 and 0.1% by weight of Inganox 168 as the stabilizers was kneaded by a biaxial extruder at 200° C., and pelletized. The pellets were injection-molded by a 55t injection molder (Toshiba Kikai) at 200° C. as cylinder temperature and 40° C. as mold temperature, and were evaluated for their properties.

The results are given in Table 6.

Comparative Example A1

The pellets were formed in the same manner as in EXAMPLE A6, except that the ethylene/1-butene copolymer composition (AB-1) was replaced by the ethylene/α-olefin copolymer composition (AB-6) of different α-olefin type and content, and were evaluated for their properties.

The results are given in Table 6.

Comparative Example A2

The pellets were formed in the same manner as in EXAMPLE A6, except that the ethylene/1-butene copolymer composition (AB-1) was replaced by the ethylene/α-olefin copolymer composition (AB-7) of different α-olefin type and content, and were evaluated for their properties.

The results are given in Table 6.

Comparative Example A3

The pellets were formed in the same manner as in EXAMPLE A6, except that the ethylene/1-butene copolymer composition (AB-1) was replaced by the ethylene/α-olefin copolymer (A1) itself, and were evaluated for their properties.

The results are given in Table 6.

Comparative Example A4

The pellets were formed in the same manner as in EXAMPLE A11, except that the ethylene/1-butene copolymer composition (AB-1) was replaced by the ethylene/α-olefin copolymer composition (B-7) of different α-olefin type and content, and were evaluated for their properties.

The results are given in Table 6.

TABLE 6

| | | | Examples | | | | | | Comparative Examples | | | |
|---|---|---|---|---|---|---|---|---|---|---|---|---|
| | | | A6 | A7 | A8 | A9 | A10 | A11 | A1 | A2 | A3 | A4 |
| Compositions | Ethylene/α-olefin copolymer compositions | AB-1 | 24 | | | | | 25 | | | | |
| | | AB-2 | | 24 | | | | | | | | |
| | | AB-3 | | | 24 | | | | | | | |
| | | AB-4 | | | | 24 | | | | | | |
| | | AB-5 | | | | | 24 | | | | | |
| | | AB-6 | | | | | | | 24 | | | |
| | | AB-7 | | | | | | | | 24 | | 25 |
| | Ethylene/α-olefin copolymer (A-1) | | | | | | | | | | 24 | |
| | Propylene | C1 | 66 | 66 | 66 | 66 | 66 | 29 | 66 | 66 | 66 | 29 |
| | | C2 | | | | | | 36 | | | | 36 |
| | Talc (D) | | 10 | 10 | 10 | 10 | 10 | 10 | 10 | 10 | 10 | 10 |
| | FM(MPa) | | 2000 | 1990 | 2010 | 2000 | 2000 | 1650 | 2020 | 1850 | 1800 | 1550 |
| | IZ(J/m)(23° C.) | | 220 | 250 | 200 | 230 | 220 | 640 | 190 | 270 | 200 | 580 |
| | IZ(J/m)(−30° C.) | | 44 | 50 | 40 | 46 | 46 | 47 | 30 | 45 | 47 | 47 |
| | Rockwell hardness | | 77 | 78 | 80 | 77 | 78 | 67 | 81 | 67 | 64 | 64 |
| | tan δ peaks | | Separated | Separated | Separated | Separated | Separated | Separated | Separated | Separated | Fused | Separated |

Production Example 2

The propylene/ethylene random copolymer (C3) was prepared in the presence of a known solid titanium catalyst. It had an intrinsic viscosity [η] of 2.0 dl/g, α-olefin containing the ethylene-derived unit at 3.4% by mole and butene-1-derived unit at 2.9% by mole, melting point of 130° C., microisotacticity of 0.97, molecular weight distribution (Mw/Mn) of 4.1 and glass transition temperature Tg of −19° C.

Table 7 describes the properties of the propylene/ethylene random copolymer (C3) used for the present invention.

TABLE 7

| Polypropylene type | C3 Polypropylene random copolymer | |
|---|---|---|
| MFR (g/10 min) | 6.4 | |
| α-olefin types | Ethylene | Butene-1 |
| α-olefin contents (mol %) | 3.4 | 2.9 |
| Tm (° C.) | 130 | |
| Mw/Mn | 4.1 | |
| Tg (° C.) | −19 | |
| [η] | 2.0 | |
| Microisotacticity | 0.97 | |

Example B1

A molten mixture of 40% by weight of the pellets of the ethylene/1-butene copolymer composition (AB-1), prepared in EXAMPLE A1, 60% by weight of the propylene/ethylene random copolymer (C3), and 0.1% by weight of calcium stearate, 0.1% by weight of Inganox 1010 and 0.1% by weight of Inganox 168 as the stabilizers was kneaded by a biaxial extruder at 200° C., and pelletized. The pellets were injection-molded by a 55 tons injection molder (Toshiba Kikai) at 200° C. as cylinder temperature and 40° C. as mold temperature, and were evaluated for their properties. The test pieces prepared by pressing at 200° C. were used for evaluation of haze, TMA and viscoelasticity.

The results are given in Table 8.

Example B2

The pellets were formed in the same manner as in EXAMPLE B1, except that the ethylene/1-butene copolymer composition (AB-1) was replaced by the ethylene/α-olefin copolymer composition (AB-2) of different α-olefin content, and were evaluated for their properties.

The results are given in Table 8.

Example B3

The pellets were formed in the same manner as in EXAMPLE B1, except that the ethylene/1-butene copolymer composition (AB-1) was replaced by the ethylene/α-olefin copolymer composition (AB-3) of different α-olefin type and content, and were evaluated for their properties.

The results are given in Table 8.

Comparative Example B1

The pellets were formed in the same manner as in EXAMPLE B1, except that the ethylene/1-butene copolymer composition (AB-1) was replaced by the ethylene/α-olefin copolymer composition (AB-6) of different α-olefin type and content, and were evaluated for their properties.

The results are given in Table 8.

Comparative Example B2

The pellets were formed in the same manner as in EXAMPLE B1, except that the ethylene/1-butene copolymer composition (AB-1) was replaced by the ethylene/α-olefin copolymer composition (AB-7) of different α-olefin type and content, and were evaluated for their properties.

The results are given in Table 8.

Comparative Example B3

The pellets were formed in the same manner as in EXAMPLE B1, except that the ethylene/1-butene copolymer composition (AB-1) was replaced by the ethylene/α-olefin copolymer (A1) itself, and were evaluated for their properties.

The results are given in Table 8.

TABLE 8

| | | | Examples | | | | | Comparative Examples | | |
|---|---|---|---|---|---|---|---|---|---|---|
| | | | B1 | B2 | B3 | B4 | B5 | B1 | B2 | B3 |
| Compositions | Ethylene/α-olefin copolymer compositions | AB-1 | 40 | | | | | | | |
| | | AB-2 | | 40 | | | | | | |
| | | AB-3 | | | 40 | | | | | |
| | | AB-4 | | | | 40 | | | | |
| | | AB-5 | | | | | 40 | | | |
| | | AB-6 | | | | | | 40 | | |
| | | AB-7 | | | | | | | 40 | |
| | Ethylene/α-olefin copolymer (A1) | | | | | | | | | 40 |
| | Propylene-basedcopolymer (C3) | | 60 | 60 | 60 | 60 | 60 | 60 | 60 | 60 |
| | FM(MPa) | | 370 | 380 | 400 | 360 | 350 | 500 | 310 | 290 |
| | Haze | | 25 | 22 | 18 | 23 | 24 | 39 | 20 | 17 |
| | IZ(J/m)(−10° C.) | | NB | NB | NB | NB | NB | 340 | NB | NB |
| | TMA(° C.) | | 120 | 120 | 120 | 120 | 120 | 120 | 105 | 100 |
| | tan δ peaks | | separated | separated | separated | separated | separated | separated | Fused | Fused |

The results are given in Table 8.

Example B4

The pellets were formed in the same manner as in EXAMPLE B1, except that the ethylene/1-butene copolymer composition (AB-1) was replaced by the ethylene/α-olefin copolymer composition (AB-4) of different α-olefin type and content, and were evaluated for their properties.

The results are given in Table 8.

Example B5

The pellets were formed in the same manner as in EXAMPLE B1, except that the ethylene/1-butene copolymer composition (AB-1) was replaced by the ethylene/α-olefin copolymer composition (AB-5) of different α-olefin type and content, and were evaluated for their properties.

What is claimed is:

1. An ethylene-based copolymer [I] characterized by:
   (a-1) having temperature ($T_m$) at the maximum peak in the endothermic curve, measured by a differential scanning calorimeter (DSC), of 40 to 90° C.,
   (a-2) the copolymer comprising a component soluble in decane at normal temperature and a component insoluble in decane at normal temperature, and
   (a-3) the component soluble in decane at normal temperature is present at 1 to 70% by weight and comprises (i) a recurring unit derived from ethylene and (ii) a recurring unit derived from an α-olefin of 4 or more carbon atoms, and in which a content of (i) the recurring unit derived from ethylene is 50 to 75% by mole,
   wherein the component insoluble at normal temperature of the ethylene-based copolymer contains a recurring unit derived from an α-olefin and cyclo-olefin of 3 or more carbon atoms and a melt flow rate (at 190° C. and a load of 2.16 kg) of 0.1 to 50 g/10 min and has a temperature Tm at the maximum peak in an endothermic curve, measured by differential scanning calorimeter (DSC), is correlated with density (d) by a relationship:

$Tm < 400 \times d - 250.$

2. An ethylene-based copolymer [II] which comprises:

a component soluble in decane at normal temperature and a component insoluble in decane at normal temperature, which satisfies the following conditions (b-1) to (b-3):

(b-1) having temperature ($T_m$) at the maximum peak in the endothermic curve of a component soluble in decane at 64° C., measured by a differential scanning calorimeter (DSC), of 40 to 90° C., (b-2) the component soluble in decane at 64° C. contains the component soluble in decane at normal temperature at 1 to 70% by weight, and (b-3) the component soluble in decane at normal temperature comprising (i) a recurring unit derived from ethylene and (ii) a recurring unit derived from an α-olefin of 4 or more carbon atoms, and in which a content of (i) the recurring unit derived from ethylene is 50 to 75% by mole, wherein the component insoluble at normal temperature of the ethylene-based copolymer contains a recurring unit derived from an α-olefin and cyclo-olefin of 3 or more carbon atoms and a melt flow rate (at 190° C. and a load of 2.16 kg) of 0.1 to 50 g/ 10 min and has a temperature Tm at the maximum peak in an endothermic curve, measured by differential scanning calorimeter (DSC), is correlated with density (d) by a relationship:

$Tm < 400 \times d - 250.$

* * * * *